(12) United States Patent
Lewis et al.

(10) Patent No.: US 7,922,939 B2
(45) Date of Patent: Apr. 12, 2011

(54) METAL NANOPARTICLE INKS

(75) Inventors: Jennifer A. Lewis, Urbana, IL (US);
Bok Yeop Ahn, Champaign, IL (US);
Eric B. Duoss, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 26 days.

(21) Appl. No.: 12/245,389

(22) Filed: Oct. 3, 2008

(65) Prior Publication Data
US 2010/0084599 A1 Apr. 8, 2010

(51) Int. Cl.
*H01B 1/22* (2006.01)
(52) U.S. Cl. .......... 252/514; 252/512; 977/773
(58) Field of Classification Search ........ 252/500, 252/514, 512; 977/773
See application file for complete search history.

(56) References Cited

U.S. PATENT DOCUMENTS

| | | |
|---|---|---|
| 2,892,797 A | 6/1959 | Alexander et al. |
| 3,878,034 A | 4/1975 | Bever et al. |
| 4,178,270 A | 12/1979 | Fujita |
| 4,181,532 A | 1/1980 | Woodhead |
| 4,410,457 A | 10/1983 | Fujimura et al. |
| 4,414,354 A | 11/1983 | Slocombe |
| 4,426,356 A | 1/1984 | Nair |
| 4,446,174 A | 5/1984 | Nakamura et al. |
| 4,471,100 A | 9/1984 | Tsubakimoto et al. |
| 4,701,218 A | 10/1987 | Rowlands et al. |
| 4,818,614 A | 4/1989 | Fukui et al. |
| 4,946,904 A | 8/1990 | Akimoto et al. |
| 4,960,465 A | 10/1990 | Arfaei |
| 5,021,596 A | 6/1991 | Barfurth et al. |
| 5,100,984 A | 3/1992 | Burge et al. |
| 5,147,841 A | 9/1992 | Wilcoxon |
| 5,196,199 A | 3/1993 | Fuisz |
| 5,237,017 A | 8/1993 | Akiyama et al. |
| 5,238,625 A | 8/1993 | Sakurai et al. |
| 5,250,476 A | 10/1993 | Mogensen et al. |
| 5,284,894 A | 2/1994 | Wasyliw et al. |
| 5,344,487 A | 9/1994 | Whalen-Shaw |
| 5,369,198 A | 11/1994 | Albrecht et al. |
| 5,393,343 A | 2/1995 | Darwin et al. |

(Continued)

FOREIGN PATENT DOCUMENTS

AU B-64095/80 9/1982

(Continued)

OTHER PUBLICATIONS

Clusters of Poly(acrylates) and Silver Nanoparticles, Falletta et al. J. Phys. Chem. C 2008, 112, 11758-11766.*

(Continued)

*Primary Examiner* — Harold Y Pyon
*Assistant Examiner* — Haidung D Nguyen
(74) *Attorney, Agent, or Firm* — Brinks Hofer Gilson & Lione

(57) ABSTRACT

Stabilized silver particles comprise particles comprising silver, a short-chain capping agent adsorbed on the particles, and a long-chain capping agent adsorbed on the particles. The short-chain capping agent is a first anionic polyelectrolyte having a molecular weight (Mw) of at most 10,000, and the long-chain capping agent is a second anionic polyelectrolyte having a molecular weight (Mw) of at least 25,000. The stabilized silver particles have a solid loading of metallic silver of at least 50 wt %.

20 Claims, 13 Drawing Sheets

U.S. PATENT DOCUMENTS

| | | |
|---|---|---|
| 5,416,071 A | 5/1995 | Igari et al. |
| 5,424,362 A | 6/1995 | Hwang et al. |
| 5,424,364 A | 6/1995 | Simms et al. |
| 5,424,466 A | 6/1995 | Stern et al. |
| 5,424,467 A | 6/1995 | Bam et al. |
| 5,424,477 A | 6/1995 | Higuchi et al. |
| 5,429,761 A | 7/1995 | Havelka et al. |
| 5,516,836 A | 5/1996 | Sauer et al. |
| 5,545,280 A | 8/1996 | Wenz |
| 5,556,460 A | 9/1996 | Berke et al. |
| 5,597,871 A | 1/1997 | Auschra et al. |
| 5,607,892 A | 3/1997 | Chopin et al. |
| 5,643,247 A | 7/1997 | Fernandez et al. |
| 5,646,200 A | 7/1997 | Duncan |
| 5,651,986 A | 7/1997 | Brem et al. |
| 5,654,006 A | 8/1997 | Fernandez et al. |
| 5,665,158 A | 9/1997 | Darwin et al. |
| 5,753,037 A | 5/1998 | Drs et al. |
| 5,753,261 A | 5/1998 | Fernandez et al. |
| 5,800,922 A | 9/1998 | Anderson et al. |
| 5,811,124 A | 9/1998 | Fernandez et al. |
| 5,820,879 A | 10/1998 | Fernandez et al. |
| 5,883,196 A | 3/1999 | Rath et al. |
| 5,891,313 A | 4/1999 | Johnson et al. |
| 5,957,828 A | 9/1999 | Hayashi |
| 5,958,858 A | 9/1999 | Bettiol et al. |
| 5,962,608 A | 10/1999 | Ryang et al. |
| 6,008,181 A | 12/1999 | Cripe et al. |
| 6,015,781 A | 1/2000 | Vinson et al. |
| 6,020,303 A | 2/2000 | Cripe et al. |
| 6,027,326 A | 2/2000 | Cesarano, III et al. |
| 6,051,636 A | 4/2000 | Johnson et al. |
| 6,060,443 A | 5/2000 | Cripe et al. |
| 6,080,216 A | 6/2000 | Erickson |
| 6,093,856 A | 7/2000 | Cripe et al. |
| 6,103,868 A | 8/2000 | Heath et al. |
| 6,107,409 A | 8/2000 | Hogan et al. |
| 6,127,094 A | 10/2000 | Victor et al. |
| 6,133,222 A | 10/2000 | Vinson et al. |
| 6,133,227 A | 10/2000 | Barnabas et al. |
| 6,136,333 A | 10/2000 | Cohn et al. |
| 6,136,428 A | 10/2000 | Truong et al. |
| 6,136,769 A | 10/2000 | Asano |
| 6,139,623 A | 10/2000 | Darwin et al. |
| 6,150,459 A | 11/2000 | Mayes et al. |
| 6,153,577 A | 11/2000 | Cripe et al. |
| 6,165,406 A | 12/2000 | Jang et al. |
| 6,167,910 B1 | 1/2001 | Chow |
| 6,207,749 B1 | 3/2001 | Mayes et al. |
| 6,211,249 B1 | 4/2001 | Cohn et al. |
| 6,228,829 B1 | 5/2001 | Vinson et al. |
| 6,242,406 B1 | 6/2001 | Katsuda et al. |
| 6,258,161 B1 | 7/2001 | Kerkar et al. |
| 6,262,129 B1 | 7/2001 | Murray et al. |
| 6,277,191 B1 | 8/2001 | Budiansky et al. |
| 6,321,791 B1 | 11/2001 | Chow |
| 6,379,974 B1 | 4/2002 | Parce et al. |
| 6,395,804 B1 | 5/2002 | Gaddam et al. |
| 6,436,167 B1 | 8/2002 | Chow et al. |
| 6,441,054 B1 | 8/2002 | Ou et al. |
| 6,451,433 B1 | 9/2002 | Oka et al. |
| 6,465,257 B1 | 10/2002 | Parce et al. |
| 6,471,761 B2 | 10/2002 | Fan et al. |
| 6,499,499 B2 | 12/2002 | Dantsker et al. |
| 6,517,199 B1 | 2/2003 | Tomioka et al. |
| 6,572,673 B2 | 6/2003 | Lee et al. |
| 6,595,232 B2 | 7/2003 | Guzman et al. |
| 6,596,545 B1 | 7/2003 | Wagner et al. |
| 6,599,647 B2 | 7/2003 | Oguri et al. |
| 6,645,444 B2 | 11/2003 | Goldstein |
| 6,670,415 B2 | 12/2003 | Jardine et al. |
| 6,673,285 B2 | 1/2004 | Ma |
| 6,746,510 B2 | 6/2004 | Kurihara et al. |
| 6,861,205 B2 | 3/2005 | Bowman et al. |
| 6,878,184 B1 | 4/2005 | Rockenberger et al. |
| 6,929,675 B1 | 8/2005 | Bunge et al. |
| 6,942,825 B2 | 9/2005 | Honda et al. |
| 6,974,493 B2 | 12/2005 | Harutyunyan et al. |
| 7,053,125 B2 | 5/2006 | Lewis et al. |
| 7,081,322 B2 | 7/2006 | Ray et al. |
| 7,141,617 B2 | 11/2006 | Gratson et al. |
| 7,160,525 B1 | 1/2007 | Peng et al. |
| 7,198,736 B2 | 4/2007 | Kasuga et al. |
| 2001/0049912 A1 | 12/2001 | Motonari et al. |
| 2002/0015846 A1 | 2/2002 | Evans et al. |
| 2002/0016387 A1 | 2/2002 | Shen |
| 2002/0121229 A1 | 9/2002 | Jardine et al. |
| 2002/0147282 A1 | 10/2002 | Mayes et al. |
| 2002/0182171 A1 | 12/2002 | Detert et al. |
| 2002/0195747 A1 | 12/2002 | Hull et al. |
| 2003/0032727 A1 | 2/2003 | Narayan-Sarathy et al. |
| 2003/0091647 A1 | 5/2003 | Lewis et al. |
| 2003/0162004 A1 | 8/2003 | Mirkin et al. |
| 2003/0177690 A1 | 9/2003 | Wittkowski et al. |
| 2004/0076822 A1 | 4/2004 | Jagota et al. |
| 2004/0096469 A1 | 5/2004 | Lewis et al. |
| 2004/0161544 A1 | 8/2004 | Kasperchik |
| 2004/0226620 A1 | 11/2004 | Therriault et al. |
| 2005/0004261 A1 | 1/2005 | Yatake |
| 2005/0189520 A1 | 9/2005 | Okada et al. |
| 2005/0196605 A1 | 9/2005 | Ramsey |
| 2006/0189113 A1* | 8/2006 | Vanheusden et al. ......... 438/597 |
| 2006/0235105 A1 | 10/2006 | Gratson et al. |
| 2006/0239902 A1 | 10/2006 | Kimura et al. |
| 2007/0172588 A1 | 7/2007 | Therriault et al. |
| 2007/0190323 A1 | 8/2007 | Lee et al. |
| 2007/0228335 A1 | 10/2007 | Gratson et al. |
| 2008/0245266 A1 | 10/2008 | Lewis et al. |
| 2009/0000678 A1 | 1/2009 | Therriault et al. |

FOREIGN PATENT DOCUMENTS

| | | |
|---|---|---|
| DE | 2052749 | 5/1972 |
| EP | 362770 A2 | 4/1990 |
| EP | 0 263 490 B1 | 1/1995 |
| GB | 2094820 A | 9/1982 |
| WO | WO 97/19711 A1 | 6/1997 |
| WO | WO 99/51335 | 10/1999 |
| WO | WO 00/47628 A | 8/2000 |
| WO | WO 01/89787 A2 | 11/2001 |
| WO | WO 02/20627 A | 3/2002 |
| WO | WO/2004/043853 | 5/2004 |
| WO | WO 2004/086044 A1 | 10/2004 |
| WO | WO 2005/000977 | 1/2005 |

OTHER PUBLICATIONS

Su, Ming et al., "Moving beyod Molecules: Patterning Solid-State Features via Dip-Pen Nanolithography with Sol-Based Inks", J. Am. Chem. Soc., vol. 124, No. 8, pp. 1560-1561, (2002).

Technical Bulletin: Pluronic P123 Block Copolymer Surfactant, BASF, 1 page, (2004).

Pierre, A.C., "Introduction to Sol-Gel Processing", Kluwer Academic Publishers, Boston, pp. 2-3, (1998).

ADVA® Flow Superplasticizer ASTM C494, Type F (carboxylated polyether) with Material Safety Data Sheet (MSDS), Grace Construction Products 10 p., 2002.

Anderson, J.R., et al., "Fabrication of Topologically Complex Three-Dimensional Microfluidic Systems in PDMS by Rapid Prototyping", Anal. Chem. 72, pp. 3158-3164, 2000.

Aref, H., "The Development of Chaotic Advection", Phys. Fluids 14, pp. 1315-1325, 2002.

Axim Italcementi Group, Catexol™ Superflux 2000 PC, with Material Safety Data Sheet (MSDS), 7 p., Nov. 13, 2002.

Bautista, F. et al., "Understanding Thixotropic and Antithixotropic Behavior of Viscoelastic Micellar Solutions and Liquid Crystalline Dispersions. I. The Model." Journal of Non-Newtonian Fluid Mechanics, vol. 80, pp. 93-113, 1999.

Bell, Nelson, et al., "Cation-Induced Collapse of Low-Molecular-Weight Polyacrylic Acid in the Dispersion of Barium Titanate", Journal of Colloid and Interface Science, 254, pp. 296-305, 2002.

Berg, J.M., et al., "Interactions between Mica Surfaces in Sodium Polyacrylate Solutions Containing Calcium Ions", Journal of Colloid and Interface Science, 161, pp. 182-189, 1993.

Breitenbach, A., et al. "Branched biodegradable polyesters for parenteral drug delivery systems", Journal of Controlled Release, vol. 64, pp. 167-178, 2000.

Burns, M.A., et al., "An Integrated Nanoliter DNA Analysis Device" Science 282, pp. 484-487, 1998.

Campbell, et al., "Fabrication of Photonic Crystals for the Visible Spectrum by Holographic Lithography," Nature, pp. 53-56, vol. 404, 2000.

Caruso et al., "Nanoengineering of Inorganic and Hybrid Hollow Spheres by Colloidal Templating," Science, pp. 1111-1114, vol. 282, 1998.

Cassagneau et al., "Conjugated Polymer Inverse Opals for Potentiometric Biosensing," Adv. Mater., pp. 1837-1841, vol. 14, 2002.

Cesarano III, Joseph et al., "Processing of Highly Concentrated Aqueous α-Alumina Suspensions Stabilized with Polyelectrolytes", J. Am. Ceram. Soc., vol. 71 No. 12, pp. 1062-1067, 1988.

Cesarano III, Joseph, et al., "Stability of Aqueous α-$Al_2O_3$ Suspensions with Poly(methacrylic acid) Polyelectrolyte", J. Am. Ceram. Soc., vol. 71, No. 4, pp. 250-255, 1988.

Chabinyc, M.L., et al., "An Integrated Fluorescence Detection System in Poly(dimethylsiloxane) for Microfluidic Applications" Anal. Chem. 73, pp. 4491-4498, 2001.

Chen et al., "Geometric Control of Cell Life and Death," Science, pp. 1425-1428, vol. 276, 1997.

Abstract of Sakai et al., "Influence of various types of inorganic salts on dispersion mechanisms of comb-type polymer containing grafted polyethylene oxides chains," Journal of the Ceramic Society of Japan, vol. 108, No. 10, pp. 904-908, 2000.

Choi, J.W., et al., "An Active Microfluidic Mixer for Mixing of Microparticles and Liquids"; SPIE Proceedings 4177, The International Society for Optical Engineering, pp. 154-161, 2000.

Chou, H.P., et al., "A Microfabricated Device for Sizing and Sorting DNA Molecules", Proc. Natl. Acad. Sci. 96, pp. 11-13, 1999.

Chrisey et al., "Materials Processing: The Power of Direct Writing," Science, vol. 289, pp. 879-881, 2000.

Clark et al., "Creating Microstructures of Luminescent Organic Thin Films Using Layer-by-Layer Assembly," Adv. Mater., pp. 1031-1035, vol. 11, 1999.

Cumpston et al., "Two-Photon Polymerization Initiators for Three-Dimensional Optical Data Storage and Microfabrication," Nature, pp. 51-54, vol. 398, 1999.

Dahlgren, M., "Effect of Counterion Valency and Ionic Strength on Polyelectrolyte Adsorption" Langmuir vol. 10, No. 5, pp. 1580-1583, 1994.

De L. Costello, et al., "Experimental investigations of the interaction forces in concentrated dispersions", Colloids and Surfaces A: Physiochemical and Engineering Aspects, 77, pp. 55-63, 1993.

Decher, "Fuzzy Nanoassemblies: Toward Layered Polymeric Multicomposites," Science, pp. 1232-1237, vol. 277, 1997.

Demers et al., "Direct Patterning of Modified Oligonucleotides on Metals and Insulators by Dip-Pen Nanolithography," Science, pp. 1836-1838, vol. 296, 2002.

Fan, H., "Rapid Prototyping of Patterned Functional Nanostructures," Nature, vol. 405, pp. 56-60, 2000.

Feiertag et al., "Fabrication of Photonic Crystals by Deep X-Ray Lithography," Appl. Phys. Lett., pp. 1441-1443, vol. 71, 1997.

Fery et al., "Nanoporous Thin Films Formed by Salt-Induced Structural Changes in Multilayers of Poly(acrylic Acid) and Poly(allylamine)," Langmuir, pp. 3779-3783, vol. 17, 2001.

Foresi et al., "Photonic-Bandgap Microcavities in Optical Waveguides," Nature, pp. 143-145, vol. 390, 1997.

Hadjichristidis, N., "Polymers with Complex Architecture by Living Anionic Polymerization", Chem. Rev. vol. 101, pp. 3747, 3771-3775, 2001.

Jacoby, Mitch, 3-D Structures From Stable Gels:, Chemical & Engineering News, vol. 80, No. 26, p. 7, Jul. 1, 2002.

Jeon, N.L., et al., "Generation of Solution and Surface Gradients Using Microfluidic Systems", Langmuir 16, pp. 8311-8316, 2000.

Jiang et al., "Exploring the Rules for Selective Deposition: Interactions of Model Polyamines on Acid and Oligoethylene Oxide Surfaces," Langmuir, pp. 1131-1143, vol. 18, 2002.

Jiang et al., "Polymer-On-Polymer Stamping: Universal Approaches to Chemically Patterned Surfaces," Langmuir, pp. 2607-2615, vol. 18, 2002.

Jones, S.W., "Interaction of Chaotic Advection and Diffusion", Chaos Applied to Fluid Mixing, Aref, H. and El Naschie, M.S., eds., pp. 185-196, 1995.

Kenny, Jack, "Digital Printing: The Excitement Grows", www.labelandnarrowweb.com, pp. 1-5, Nov. 2000.

Kenny, Jack, "Specialty Ink", www.labelandnarrowweb.com, pp. 1-4, Sep. 2003.

Kiriy et al., "Cascade of Coil-Globule Conformational Transitions of Single Flexible Polyelectrolyte Molecules in Poor Solvent," J. Am. Chem. Soc., pp. 13454-13462, vol. 124, 2002.

Laarz, E. et al., "The Effect of Anionic Polyelectrolytes on the Properties of Aqueous Silicon Nitride Suspensions", Journal of the European Ceramic Society, vol. 20, pp. 431-440, 2000.

Label & Narrow Web, "Specialty Inks", pp. 1-14., Nov. 2000.

Landers et al., "Rapid Prototyping of Scaffolds Derived from Thermoreversible Hydrogels and Tailored for Applications in Tissue Engineering," Biomaterials, pp. 4437-4447, vol. 23, 2002.

Lazaris et al., "Spider Silk Fibers Spun from Soluble Recombinant Silk Produced in Mammalian Cells," Science, pp. 472-476, vol. 295, 2002.

Lee et al., "Multi-Photon Polymerization of Waveguide Structures Within Three-Dimensional Photonic Crystals," Adv. Mater., pp. 271-274, vol. 14, 2002.

Lewis, "Direct-Write Assembly of Ceramics from Colloidal Inks," Curr. Opin. Solid State Mat. Sci., pp. 245-250, vol. 6, 2002.

Li, C., et al., "Effect of a comb-like amphiphilic polymer on the stability of alumina dispersions", Colloids and Surfaces, 69, pp. 155-158, 1992.

Li, Chia-Chen, et al., "Interaction between Dissolved Ba2+ and PAA-NH4 Dispersant in Aqueous Barium Titanate Suspensions", Journal of the American Ceramic Society, vol. 85, No. 6, pp. 1449-1455, 2002.

Lin et al., "A Three-Dimensional Photonic Crystal Operating at Infrared Wavelengths," Nature, pp. 251-253, vol. 394, 1998.

Loctite Corporation Prussian Blue, Material Safety Data Sheet dated Jan. 6, 2002, 5 pages; http://www.loctite.com/datasheets/msds/30520.html, Jan. 14, 2002.

Loctite® Product Description Sheet Prussian Blue, Maintenance, Repair & Operations, 1p, Jan. 1999.

Losey, M.W., et al., "Microfabricated Multiphase Packed-Bed Reactors: Characterization of Mass Transfer and Reactions", Ind. Eng. Chem. Res. 40, pp. 2555-2562, 2001.

Mas, R., et al., "Rheology of Colloidal Suspensions: Case of Lubricating Greases," Journal of Rheology, vol. 38, No. 4, pp. 889-908, 1994.

Meier-Haack et al., "Pervaporation Separation of Water/Alcohol Mixtures Using Composite Membranes Based on Polyelectrolyte Multilayer Assemblies," J. Membr. Sci., pp. 233-243, vol. 184, 2001.

Moore, S.K., "Microfluidics for Complex Computation", IEEE Spectrum 38, pp. 28-29, 2001.

Napper, Donald H., "Polymeric Stabilization of Colloidal Dispersions" Academic Press, Inc., pp. 28-30, 1983.

Noda et al., "Full Three-Dimensional Photonic Bandgap Crystals at Near-Infrared Wavelengths," Science, pp. 604-606, vol. 289, 2000.

Orgeret-Ravanat, C. et al., "Adsorption/Desorption of a PEO-rich Comb-like Polymer at a Silica/Aqueous Solution Interface", Colloids and Surfaces vol. 33, pp. 109-119, 1988.

Piner et al., "Dip-Pen" Nanolithography, Science, pp. 661-663, vol. 283, 1999.

Polymer Source, Inc., Information Sheet—Custom Synthesis, comb polymer (poly(acrylic acid) backbone and poly(ethylene oxide) teeth), 2 p., Nov. 13, 2002.

Reed, James S., "Principles of Ceramic Processing", $2^{nd}$ Ed., John Wiley & Sons, Inc., pp. 525-541, 1995.

Sakai, E., et al., "Dispersion Mechanisms of Comb-Type Superplasticizers Containing Grafted Poly(ethylene oxide) Chains", Macromol. Symp. 175, pp. 367-376, 2001.

Schwartz, Steven A., "Gypsum Dispersing Agents", Global Gypsum Conference, pp. 1-10, 2002.

Seidel et al., "Artificial Spinning of Spider Silk," Macromolecules, pp. 6733-6736, vol. 31, 1998.

Silkroad C&T:Admixtures for Concrete, PEMA-200N, Product Information Sheet, 2 p., 2002.

Smay et al., "Colloidal Inks for Directed Assembly of 3-D Periodic Structures," Langmuir, pp. 5429-5437, vol. 18, 2002.
Smay et al., "Directed Colloidal Assembly of 3D Periodic Structures," Adv. Mater., pp. 1279-1283, vol. 14, 2002.
Smay, James E., et al., "Colloidal Inks for Directed Assembly of 3-D Periodic Structures", Langmuir, pp. 5429-5437, vol. 18, No. 14, 2002.
Stenius, P. et al., "Aggregation in concentrated kaolin suspensions stabilized by polyacrylate", Colloids and Surfaces, vol. 51, pp. 219-238, 1990.
Stromberg, A., et al., "Microfluidic Device for Combinatorial Fusion of Liposomes and Cells", Anal. Chem. 73, pp. 126-130 2001.
Sukhishvili et al., "Layered, Erasable, Ultrathin Polymer Films," J. Am. Chem. Soc., pp. 9550-9551, vol. 122, 2000.
Takemoto Oil & Fat Co. Ltd. Product Information Sheet, 2 p., Nov. 13, 2002.
Tobori, N. et al., "Rheological behavior of highly concentrated aqueous calcium carbonate suspensions in the presence of polyelectrolytes", Colloids and Surfaces A: Physiochem. Eng. Aspects 00, pp. 1-9, 2002; (2 pages)—vol. 215, pp. 163-171, 2003.
Uhrig, D., et al., "Synthesis of Combs, Centipedes, and Barbwires: Poly(isoprene-graft-styrene) Regular Multigraft Copolymers with Trifunctional, Tetrafunctional, and Hexafunctional Branch Points", Macromolecules vol. 35, pp. 7182-7190, 2002.
Vermohlen, K., et al., "Adsorption of polyelectrolytes onto oxides—the influence of ionic strength, molar mass, and Ca2+ ions", Colloids and Surfaces A: Physiocochem. Eng. Aspects 163, pp. 45-53, 2000.
Vlasov et al., "On-Chip Natural Assembly of Silicon Photonic Bandgap Crystals," Nature, pp. 289-293, vol. 414, 2001.
Vollrath et al., "Liquid Crystalline Spinning of Spider Silk," Nature, pp. 541-548, vol. 410, 2001.
White, S.R., et al., "Autonomic Healing of Polymer Composites", Nature 409, pp. 794-797, 2001.
Wu et al., "Fabrication of Complex Three-Dimensional Microchannel Systems in PDMS," J. Am. Chem. Soc., pp. 554-559, vol. 125, 2003.
Xia et al., "Soft Lithography," Angew. Chem Int. Ed., pp. 550-575, vol. 37, 1998.
Zezin et al., "A New Class of Complex Water-Soluble Polyelectrolytes," Russ. Chem. Rev., pp. 833-855, vol. 51, 1982.
Allahyarov, E. et al., "Attraction between Like-Charged Macroions by Coulomb Depletion", Physical Review Letters, vol. 81, No. 6, pp. 1334-1337, 1998.
Allahyarov, E. et al., "Effective forces between macroions: The cases of asymmetric macroions and added salt", Physical Review E, vol. 57, No. 5, pp. 5818-5824, 1998.
BIC, "Zeta Potential Applications", article from the Internet, http://www.bic.comfZetaPotentialApplications.htm>, 4 pages, printed Sep. 14, 2001.
Braun, Paul V. et al., "Electrochemical Fabrication of 3D Microperiodic Porous Materials", Advanced Materials, vol. 13, No. 7, pp. 482-485, 2001.
Braun, Paul V. et al., "Electrochemically grown photonic crystals", Nature, vol. 402, pp. 603-604, 1999.
Braun, Paul V. et al., "Optical spectroscopy of high dielectric contrast 3D photonic crystals", Europhys. Lett., vol. 56, pp. 207-213, 2001.
CAMP Annual Report 2000, "Colloidal Dispersions and Processing", Center for Advanced Materials Processing, 2000, article from the Internet, http://www.clarkson.edu/camp/annual_report/page6.htm>, 2 pages, printed Sep. 14, 2001.
Ferreira, Paula G. et al., "Mixtures of charged colloids and nonadsorbing flexible polyelectrolytes: An integral equation study", J. Chem. Phys., vol. 113, No. 21, pp. 9849-9862, 2000.
Garibay-Alonso, R. et al., "Phase separation of binary liquid mixtures of hard spheres and Yukawa particles", Physica A, vol. 235, pp. 159-169, 1997.
Malvern, "The use of the Malvern Zetasizer for the measurement of Zeta Potential", article from the Internet, http://www.malvern.co.alLaboratory/zetaintm.htm>, 10 pages, printed on Feb. 12, 2002.
Malvern, "Zeta Potential Theory, Dispersion stability", article from the Internet, http://www.malvern.co.uk/Laboratory/zettheo.htm>, 3 pages, printed on Feb. 12, 2002.

Mendez-Alcaraz, J.M. et al., "Depletion forces in colloidal mixtures", Physical Review E, vol. 61, No. 4, pp. 4095-4099, 2000.
Mendez-Alcaraz, J.M. et al., "Structural properties of colloidal suspensions", Physica A, vol. 220, pp. 173-191, 1995.
Mendez-Alcaraz, J.M. et al., "Structure of Binary Colloidal Mixtures of Charged and Uncharged Spherical Particles", Langmuir, vol. 8, pp. 2913-2920, 1992.
Nguyen, T. T. et al., "Macroions in Salty Water with Multivalent Ions: Giant Inversion of Charge", Physical Review Letters, vol. 85, No. 7, pp. 1568-1571, 2000.
Ramakrishnan, S. et al., "Characterizing nanoparticle interactions: Linking models to experiments", J. Chem. Phys., vol. 113, No. 3, pp. 1237-1248, 2000.
Rouzina, Ioulia et al., "Macroion Attraction Due to Electrostatic Correlation between Screening Counterions. 1. Mobile Surface-Adsorbed Ions and Diffuse Ion Cloud", J. Chem. Phys., vol. 100, No. 23, pp. 9977-9989, 1996.
The Sol-Gel Gateway, "Suppliers-Colloidal solutions and nanoparticles", article from the Internet, http://www.solgel.com/precursors/sols.htm>, 3 pages, printed on Sep. 14, 2001.
Tohver, Valeria, "Nanoparticle Engineering of Complex Fluid Behavior", Langmuir, vol. 17, No. 26, pp. 8414-8421, 2001.
Tohver, Valeria, "Nanoparticle halos: A new colloid stabilization mechanism", PNAS, vol. 98, No. 16, pp. 8950-8954, 2001.
Verhaegh, Nynke et al., "Transient gelation by spinodal decomposition in colloid-polymer mixtures", Physica A, vol. 242, pp. 104-118, 1997.
Verhaegh, Nynke et al., "Transient gels in colloid-polymer mixtures studied with fluorescence confocal scanning laser microscopy", Physica A, vol. 264, pp. 64-74, 1999.
Weeks, James R., "Formation and collapse of gels of sterically stabilized colloidal particles", J Phys. Condens. Matter, vol. 12, pp. 9599-9606, 2000.
Wessling, Dr. Berhard, "Conductive Polymer / Solvent Systems: Solutions or Dispersions?", Zipperling Kessler/ Ormecon Chemie, dated 1996, article from the Internet, http://www.zipperling.de/Research/soludisp/kap13.html>, printed Sep. 14) 2 pages, printed Sep. 14, 2001.
Vincent, B. et al., "Adsorption of Small, Positive Particles onto Large, Negative Particles in the Presence of Polymer", J.C.S. Faraday I, V. 76, Iss. 3, pp. 665-673, 1980.
Luckham, P.F., et al., "The Controlled Flocculation of Particulate Dispersions Using Small Particles of Opposite Charge. III. Investigation of Floc Structure Using Rheological Techniques", Colloids and Surfaces, vol. 6, pp. 101-118, 1983.
Hawley's Condensed Chemical Dictionary, Eleventh Edition, edited by Sax and Lewis, Sr. (Van Nostrand Reinhold Company, New York, NY, copyright 1987),p. 25, (Oct. 1989).
Michna, S. et al., "Concentrated hydroxyapatite inks for direct-write assembly of 3-D periodic scaffolds", Biomaterials, vol. 26, pp. 5632-5639, (2005).
Deubel, M. et al., "Direct laser writing of three-dimensional photonic-crystal templates for telecommunications", Nature Materials, vol. 3, pp. 444-447, (2004).
Kim, I. et al., "Ultrasensitive chemiresistors based on electrospun $TiO_2$ nanofibers", NanoLetters, vol. 6, No. 9, pp. 2009-2013, (2006).
Ding, X-Z. et al., "Effect of tin dioxide doping on rutile phase formation in sol-gel-derived nanocrystalline titania powders", NanoStructured Materials, vol. 4, No. 6, pp. 663-668, (1994).
Chutinan, A. et al., "Highly confined waveguides and waveguide bends in three-dimensional photonic crystal", Applied Physics Letters, vol. 75, No. 24, pp. 3739-3741, (1999).
Cotton, F.A. et al., Advanced Inorganic Chemistry, Fifth Edition, ed. John Wiley & sons, pp. 215-217, pp. 781-782, 7 pages total, (1988).
Seet, K.K. et al., "Three-dimensional spiral-architecture photonic crystals obtained by direct laser writing", Advanced Materials, vol. 17, No. 5, pp. 541-545, (2005).
Morissette, S.L. et al., "Solid freeform fabrication of aqueous alumina-poly(vinyl alcohol) gelcasting suspensions", Journal of the American Ceramic Society, vol. 83, No. 10, pp. 2409-2416, (2000).
Morrissette, S.L. et al., "Chemorheology of aqueous-based alumina-poly(vinyl alcohol) gelcasting suspensions", Journal of the American Ceramic Society, vol. 82, No. 3, pp. 521-528, (1999).

Kozuka H. et al., "Crack-free thick ceramic coating films via non-repetitive dip-coating using polyvinylpyrrolidone as stress-relaxing agent", Journal of Sol-Gel Science and Technology, vol. 19, pp. 205-209, (2000).

DuPont Tyzor Organic Titanates General Brochure found at http://www.dupont.com/tyzor, 12 pages, (2001).

Duoss, E.B. et al, "Sol-gel inks for direct-write assembly of functional oxides", Adv. Mater, vol. 19, pp. 3485-3489, (2007).

Weeks, E.R. et al., "Three-Dimensional Direct Imaging of Structural Relaxation Near the Colloidal Glass Transition", Science, vol. 287, pp. 627-631, (2000).

Manley, S. et al., "Glasslike Arrest in Spinodal Decomposition as a Route to Colloidal Gelation", Phys. Rev. Lett., 95, Art. No. 238302, pp. 238302-1 thru 23802-4, (2005).

Trappe, V. et al., "Jamming phase diagram for attractive particles", Nature, vol. 411, pp. 772-775, (2001).

Anderson, V.J. et al., "Insights into phase transition kinetics from colloid science", Nature, vol. 416, pp. 811-815, (2002).

Lewis, J.A., Colloidal Processing of Ceramics. J. Am. Ceram. Soc., 83, (10), pp. 2341-2359, (2000).

Martinez, C.J. et al., "Shape Evolution and Stress Development During Latex-Silica Film Formation", Langmuir, 18, pp. 4689-4698, (2002).

Fichtner, M. et al., "Small Ti clusters for catalysis of hydrogen exchange in NaAlH4. Nanotechnology", 14, (7), pp. 778-785, (2003).

Kim, A.S. et al, "Cake resistance of aggregates formed in the diffusion-limited-cluster-aggregation (DLCA) regime", J. Membrane Science, 286, pp. 260-268, (2006).

Weitz, D.A. et al., "Fractal Structures Formed by Kinetic Aggregation of Aqueous Gold Colloids", Phys. Rev. Lett., 52, pp. 1433-1436, (1984).

Carpineti, M. et al., "Transition from Semiorder to Disorder in the Aggregation of Dense Colloidal Solutions", Phys. Rev. Lett., 70, (24), pp. 3828-3830, (1993).

Chen, M. et al., "Characteristics of Flocculated Silica Dispersions", J. Colloid Interface Sci., 141, pp. 564-577, (1991).

Varadan, P. et al., "Direct visualization of long range structural heterogeneity in colloidal gels", Langmuir, 19, pp. 509-512 (2003).

Hütter, M., "Local Structure Evolution in Particle Network Formation Studied by Brownian Dynamics Simulation", J. Colloid and Interface Sci., 231, pp. 337-350, (2000).

Dinsmore, A.D. et al., "Microscopic Structure and Elasticity of Weakly Aggregated Colloidal Gels", Phys. Rev. Lett., 96, Art. No. 185502, pp. 185502-1 thru 185502-4, (2006).

Ramakrishnan, S. et al. "Microstructure and Rheology of Thermoreversible Nanoparticle Gels", Langmuir, 22, pp. 7833-7842, (2006).

Ramakrishnan, S. et al., "Clustering and mechanics in dense depletion and thermal gels", Langmuir, 21, pp. 9917-9925, (2005).

Chung, B. et al. "Microscopic Dynamics of Recovery in Sheared Depletion Gels", Phys. Rev. Lett., 96, Art. No. 228301, pp. 228301-1 thru 228301-4, (2006).

Krall, A.H. et al., "Internal Dynamics and Elasticity of Fractal Colloidal Gels", Phys. Rev. Lett., 80, (4), pp. 778-781, (1998).

Weeks, E.R. et al., "Properties of cage rearrangements observed near the colloidal glass transition", Phys. Rev. Lett., 89, (Art. No. 095704), pp. 095704-1 thru 095704-4, (2002).

Puertas, A.M. et al., "Dynamical heterogeneities close to a colloidal gel", J. Chem. Phys., 121, (6), pp. 2813-2822, (2004).

Puertas, A.M. et al., "Mode Coupling and Dynamical Heterogeneity in Colloidal Gelation A Simulation Study", J. Phys. Chem. B, 109, pp. 6666-6675, (2005).

Kegel, W.K. et al., "Direct Observation of Dynamical Heterogeneities in Colloidal Hard-Sphere Suspensions", Science, 287, pp. 290-293, (2000).

Crocker, J.C., "Methods of Digital Video Microscopy for Colloidal Studies", J. Colloid and Interface Sci., 179, pp. 298-310, (1996).

Dinsmore, A.D. et al., "Direct imaging of three-dimensional structure and topology of colloidal gels", J. Phys. Cond. Matter, 14, pp. 7581-7597, (2002).

Dibble, C.J. et al., "Structure and dynamics of colloidal depletion gels: Coincidence of transitions and heterogeneity", Phys. Rev. E., 74, Art. No. 041403, pp. 041403-1 thru 041403-11 (2006).

Leunissen, M.E. et al. "Ionic colloidal crystals of oppositely charged particles", Nature, 437, (8), pp. 235-240, (2005).

Van Blaaderen, A. et al., "Template-directed colloidal crystallization", Nature, 385, pp. 321-324, (1997).

Lee, W. et al., "Nanoparticle-Mediated Epitaxial Assembly of Colloidal Crystals on Patterned Substrates", Langmuir, 20, pp. 5262-5270, (2004).

Solomon, T. et al., "Stacking fault structure in shear-induced colloidal crystallization", J. Chem Phys., 124, Art. No. 134905, pp. 134905-1 thru 134905-10, (2006).

Schall, P. et al., "Visualization of Dislocation Dynamics in Colloidal Crystals", Science, 305, pp. 1944-1948, (2004).

Mohraz, A. et al., "Direct Visualization of Colloidal Rod Assembly by Confocal Microscopy", Langmuir, 21, pp. 5298-5306, (2005).

Pham, K.N. et al., "Multiple Glassy States in a Simple Model System", Science, 296, pp. 104-106, (2002).

Segre, P.N.; "Glasslike kinetic arrest at the colloidal-gelation transition", Phys. Rev. Lett., 86, (26), pp. 6042-6045, (2001).

Scheidler, P. et al., "Cooperative motion and growing length scales in supercooled confined liquids", Europhys. Letters, 59 (5), pp. 701-707, (2002).

Kim, K. et al., "Apparent finite-size effects in the dynamics of supercooled liquids", Phys. Rev. E, 61, (1), pp. R41-R44, (2000).

Malek, K. et al., "Effects of surface roughness on self- and transport diffusion in porous media in the Knudsen regime", Phys. Rev. Lett., 87, (12), Art. No. 125505, pp. 125505-1 thru 125505-4, (2001).

Elimelech, M. et al., "Kinetics of Deposition of Colloidal Particles in Porous Media", Environmental Science and Technology, 24, pp. 1528-1536, (1990).

Bogush, G.H. et al., "Preparation of monodisperse silica particles: Control of size and mass fraction", Journal of Non-Crystalline Solids, 104, pp. 95-106, (1988).

van Blaaderen, A. et al., "Synthesis and Characterization of Colloidal Dispersions of Fluorescent, Monodisperse Silica Spheres", Langmuir, 8, pp. 2921-2931, (1992).

Dinsmore, A.D. et al. "Three-dimensional confocal microscopy of colloids", Appl. Opt., 40, (24), pp. 4152-4159, (2001).

Baxter, R.J., "Percus-Yevick equation for hard spheres with surface adhesion", J. Chem. Phys. 49, pp. 2770-2774, (1968).

Shih, W-H, et al., "Scaling behavior of the elastic properties of colloidal gels", Phys. Rev. A, 42, (8), pp. 4772-4779, (1990).

de Rooij, R. et al., "Elasticity of weakly aggregating polystyrene latex dispersions", Phys. Rev. E, 49, (4), pp. 3038-3049, (1994).

Potanin, A.A. et al., "Microrheological modeling of weakly aggregated dispersions", J. Chem. Phys., 102, (14), pp. 5845-5853, (1995).

Wolthers, W. et al. "Linear viscoelastic behavior of aggregated colloidal dispersions", Phys. Rev. E, 56, (5), pp. 5726-5733, (1997).

Mellema, M. et al., "Categorization of rheological scaling models for particle gels applied to casein gels", J. Rheol., 46, (1), pp. 11-29, (2002).

Mohraz, A. et al, "Orientation and rupture of fractal colloidal gels during start-up of steady shear flow", J. Rheology, 49, (3), pp. 657-681, (2005).

Eckert, T. et al., "Re-entrant Glass Transition in a Colloid-Polymer Mixture with Depletion Attractions", Phys. Rev. Lett., 89, (12), Art. No. 125701, pp. 125701-1 thru 125701-4, (2002).

Kirby H.K. et al., "Poly(acrylic acid)—poly(ethylene oxide) comb polymer effects on BaTiO3 nanoparticle suspension stability", J. Am. Ceram. Soc., 87, (2), pp. 181-186, (2004).

Li,Q. et al., "Nanoparticle inks for directed assembly of three-dimensional periodic structures", Adv. Mater., 15, (19), pp. 1639-1643, (2003).

D.H. Napper, "Polymeric Stabilization of Colloidal Dispersions", Academic Press, pp. 28-30, (1983).

Zukoski C.F., "Material properties and the electrorheological response", Annu. Rev. Mater. Sci., 23, pp. 45-78, (1993).

Lewis, J.A. et al., "Direct Ink Writing of Three-Dimensional Ceramic Structures", J. Am. Ceram. Soc., 89 [12], pp. 3599-3609, (2006).

Mohraz, A. et al., "Structure and Dynamics of Biphasic Colloidal Mixtures", Phys. Rev. E, 77, Art No. 060403(R), pp. 060403-1 thru 060403-4, (2008).

Croucher, M. et al., "Selective Flocculation in Heterosterically Stabilised Nonaqueous Dispersions", Colloids and Surfaces, 1, pp. 349-360, (1980).

Rao, R. et al., Abstract of Biphasic Nanoparticle Inks for the Direct Writing of 3D Ceramic Structures, Department of Materials Science and Engineering, Univer. of Ill. at Urbana-Champaign, 1 page, (2006).

Whitby, C.P. et al., "PAA/PEO comb polymer effects on rheological properties and interparticle forces in aqueous silica suspensions", J. of Colloid and Interface Science, 262, pp. 274-281, (2003).

Lewis, J.A. et al., "Direct writing in three dimensions", Materials Today, pp. 32-39, (2004).

Duoss, E.B. et al., "Sol-Gel Inks for Direct-Write Assembly of Functional Oxides", Advanced Materials, 19, pp. 3485-3489, (2007).

Ryu, B-H. et al., "Synthesis of highly concentrated silver nanosol and its application to inkjet printing", Colloids and Surfaces A: Physiochem. Eng. Aspects, 270-71, pp. 345-351, (2005).

Xu, X. et al., "γ-Radiation synthesis of poly(acrylic acid)-metal nanocomposites", Materials Letters, 37, pp. 354-358, (1998).

Magdassi, S. et al., "Silver Nanoparticles as Pigments for Water-Based Ink-Jet Inks", Chem. Mater., 15, pp. 2208-2217, (2003).

Wang, W. et al., "Silver Nanoparticles Capped by Long-Chain Unsaturated Carboxylates", J. Phys. Chem. B, 103, pp. 7238-7246, (1999).

Jana, N.R. et al., "Single-Phase and Gram-Scale Routes toward Nearly Monodisperse Au and Other Noble Metal Nanocrystals", J. Am. Chem. Soc., 125, pp. 14280-14281, (2003).

Lin, X.Z. et al. "Direct Synthesis of Narrowly Dispersed Silver Nanoparticles Using a Single-Source Precursor", Langmuir, 19, pp. 10081-10085, (2003).

Wu, R-T. et al., "Preparation of highly concentrated and stable suspensions of silver nanoparticles by an organic base catalyzed reduction reaction", Materials Research Bulletin, 43, pp. 1276-1281, (2008).

Yamamoto, M. et al., "Size-Controlled Synthesis of Monodispersed Silver Nanoparticles Capped by Long-Chain Alkyl Carboxylates from Silver Carboxylate and Tertiary Amine", Langmuir, 22, pp. 8581-8586, (2006).

Fuller, S.B. et al., "Ink-Jet Printed Nanoparticle Microelectromechanical Systems", Journal of Microelectromechanical Systems, 11, pp. 54-60, (2002).

Kim, D. et al., "Direct writing of silver conductive patterns: Improvement of film morphology and conductance by controlling solvent compositions", Applied Physics Letters, 89, pp. 264101-1 thru 264101-3, (2006).

Perelaer, J. et al., "Ink-jet Printing and Microwave Sintering of Conductive Silver Tracks", Advanced Materials, 18, pp. 2101-2104, (2006).

Moon, K-S. et al., "Thermal Behavior of Silver Nanoparticles for Low-Temperature Interconnect Applications", J. Electronic Materials, 34, pp. 168-175, (2005).

Chou, K-S. et al., "Fabrication and sintering effect on the morphologies and conductivity of nano-Ag particle films by the spin coating method", Nanotechnology, 16, pp. 779-784, (2005).

Jones, J. et al., "Stretchable Wavy Metal Interconnects", J. Vacuum Sci. Technol. A, 22, pp. 1723-1725, (2004).

Khang, D-Y. et al., "A Streatchable Form of Single-Crystal Silicon for High Performance Electronics on Rubber Substrates", Science, 311, pp. 208-212, (2006).

Shiraishi, Y. et al., "Oxidation of ethylene catalyzed by colloidal dispersions of poly(sodium acrylate)-protected silver nanoclusters", Colloids and Surfaces A: Physicochemical and Engineering Aspects, 169, pp. 59-66, (2000).

Chapman, R. et al., "Electro-optical shifts in silver nanoparticle films", Chemical Physics Lett., 349, pp. 358-362, (2001).

Pastoniza-Santos, I. et al., "Formation and Stabilization of Silver Nanoparticles through Reduction by N,N-Dimethylformamide", Langmuir, 15, pp. 948-951, (1999).

Cliffel, D.E. et al., "Mercaptoammonium-Monolayer-Protected, Water-Soluble Gold, Silver, and Palladium Clusters", Langmuir, 16, pp. 9699-9702, (2000).

Kuo, P-L. et al., "Formation of Silver Nanoparticles under Structured Amino Groups in Pseudo-dendritic Poly(allylamine) Derivatives", J. Phys. Chem. B, 107, pp. 11267-11272, (2003).

Pal, T. et al., "Reversible Formation and Dissolution of Silver Nanoparticles in Aqueous Surfactant Media", Langmuir, 13, pp. 1481-1485, (1997).

Prasad, B.L.V. et al., "Solvent-Adaptable Silver Nanoparticles", Langmuir, 21, pp. 822-826, (2005).

Chang, J.S. et al., "Optimization of Nanosized Silver Particle Synthesis via Experimental Design", Ind. Eng. Chem. Res., 46, pp. 5591-5599, (2007).

Pyatenko, A. et al., "Synthesis of Spherical Silver Nanoparticles with Controllable Sizes in Aqueous Solutions", J. Phys. Chem. C, 111, pp. 7910-7917, (2007).

Slistan-Grijalva, A. et al., "Synthesis of silver nanoparticles in a polyvinylpyrrolidone (PVP) paste, and their optical properties in a film and in ethylene glycol", Materials Research Bulletin, 43, pp. 90-96, (2008).

Park, J-U. et al., "High-resolution electrohydrodynamic jet printing", Nature Materials, 6, pp. 782-789, (2007).

Gratson, G.M. et al., "Direct writing of three-dimensional webs", Nature, 428, p. 386, (2004).

Toshima, N. et al., "Effect of additional metal ions on catalyses of polymer-stabilized metal nanoclusters", J. of Molecular Catalysis A: Chemical, 177, pp. 139-147, (2001).

Xu, P. "Polymer-ceramic nanocomposites: Ceramic phases", Encyclopedia of Materials: science and Technology, pp. 1-6, Pergamon Press, (2001).

Caracoche, et al., "Zirconium oxide structures prepared by the sol-gel route: 1, The role of the alcoholic solvent", Journal of the American Ceramics Society, vol. 83, No. 2, pp. 377-384, (2000).

The Invitation to Pay Additional Fees and Communication Relating to the Results of the Partial International Search Report of the International Searching Authority dated Feb. 2, 2010 for International Patent Application No. PCT/US2009/059348.

International Search Report and Written Opinion for PCT/US2009/059348 dated Jul. 15, 2010.

* cited by examiner

METAL NANOPARTICLE INKS

FEDERALLY SPONSORED RESEARCH OR DEVELOPMENT

This invention was made with government support under DEFG-02-91 ER454339 awarded by the Department of Energy, and under DAAD19-03-1-0227 awarded by the Army Research Laboratory. The government has certain rights in the invention.

BACKGROUND

Printing techniques such as screen printing, flexography, gravure, and offset lithography have been widely used throughout history for both graphics arts and, more recently, materials assembly. However, the push towards smaller feature sizes has focused attention on other print-based approaches, such as inkjet printing[1] and direct ink writing (DIW),[2-4] where ink is deposited through fine nozzles onto a substrate. Inkjet printing is a droplet-based approach primarily limited to low aspect-ratio features (for example, 100 nm thick and 100 μm wide) geometries for single pass and supported features in multipass printing due to the diluted solids content of the liquid-like inks. Alternatively, DIW is a filament-based approach that affords the creation of continuous, fine scale, high aspect ratio, and self-supporting electrodes due to the high concentration and stiffness of silver particle inks expressly engineered for these properties.

The design of metallic inks for self-supporting printed electronics poses considerable challenges. Several requirements must be met simultaneously, including careful control over particle size and solids loading, appropriate rheological behavior to facilitate deposition, low resistivity at modest curing temperature, and compatibility with a variety of substrate materials. While some commercial metallic pastes (or paints) are conductive under ambient conditions, they typically contain large particles (0.1~10 μm) and, hence, are not suitable for patterning at the microscale due to nozzle clogging.

To date, solution based synthetic methods have yielded stable silver dispersions with relatively low solids loading (typically ~10 wt %) that are not suitable for printing self-supporting electrodes. Typically, silver nanoparticles are synthesized in solution via the reduction of silver precursors in the presence of surface capping and reducing agents. The surface capping agents usually contain functional groups, such as thiol (~SH), carboxyl (~COOH), or amine (~NH) groups, whereas sodium borohydride (or citrate), hydrazine, or polyol are used as reducing agents. It is challenging to synthesize stable and highly concentrated (>50 wt %) nanoparticle inks due to their strong tendency to agglomerate.

PAA, a water-soluble polyelectrolyte is a well-known effective capping agent for stabilizing silver particles. Hydrophilic silver particles are produced by this method. The carboxyl (—COOH) group in PAA provides an active site for capping in the presence of reducing agents, such as $NaBH_4$, $H_2NNH_2$, and light irradiation. B. H. Ryu, et al. demonstrated silver nanosol with high silver content (50 wt %) using an aqueous $AgNO_3$/PAA-Na salt/$NaBH_4$ system.[5] X. Xu et al. reported metal nanocomposites using an aqueous $AgNO_3$/Acrylic acid/γ-ray system.[6] N. Toshima, et al. investigated silver nanoclusters using an aqueous $AgClO_4$/PAA-Na salt/UV-ray system.[7]

Other carboxyl (—COOH) group functionalized compounds have also been used as capping agents. S. Magdassi, et al. demonstrated an aqueous silver nanocolloids stabilized by carboxylmethyl cellulose as a capping agent in the presence of trisodium citrate as a reducing agent.[8] In contrast, long-chain carboxylates provide hydrophobic silver particles that are dispersible in toluene or hexane.[9-12]

Alkyl amines have commonly been used as reducing agents (short-chain amines), as well as capping agents (long chain amines). The silver particles obtained from this method are generally hydrophobic and only dispersible in organic solvents.[13-16]

Direct printing of self-supporting electrodes, such as spanning and three-dimensional (3-D) structures is challenging. The conventional ink-jet printing method uses droplet based printing, which is not suitable for producing self-supporting electrodes due to a spreading issue of liquid-like inks. S. B. Fuller, et al. demonstrated 3-D silver electrodes by ink-jet printing using reiteration of printing and curing process for each layer.[17]

SUMMARY

In a first aspect, the present invention is stabilized silver particles, comprising particles comprising silver, a short-chain capping-agent adsorbed on the particles, and a long-chain capping agent adsorbed on the particles. The short-chain capping agent is a first anionic polyelectrolyte having a molecular weight (Mw) of at most 10,000, and the long-chain capping agent is a second anionic polyelectrolyte having a molecular weight (Mw) of at least 25,000. The stabilized silver particles have a solid loading of metallic silver of at least 50 wt %.

In a second aspect, the present invention is a silver particle ink, comprising the stabilized silver particles, and water. The silver particle ink has a solid loading of metallic silver of at least 50 wt %.

In a third aspect, the present invention is a silver particle ink, comprising particles comprising silver, and an ink solvent. The silver particle ink is shear thinning, and the silver particle ink has an elastic modulus, G', and viscous modulus, G", such that G'>G". The silver particle ink has a solid loading of metallic silver of at least 50 wt %.

In a fourth aspect, the present invention is a method of forming a conductive structure, comprising forming a structure from the silver particle ink, and heating the structure at a temperature of 150-550° C., to form the conductive structure.

In a fifth aspect, the present invention is a method of forming stabilized silver particles, comprising forming a solution comprising a reducing agent, a short-chain capping agent, a long-chain capping agent, and $Ag^+$ ions, to form silver particles; and growing the silver particles to a mean particle size of 10-50 nm. The short-chain capping agent is a first anionic polyelectrolyte having a molecular weight (Mw) of at most 10,000, the long-chain capping agent is a second anionic polyelectrolyte having a molecular weight (Mw) of at least 25,000, and the reducing agent comprises a hydroxyl group terminated amine containing 2-10 carbon atoms.

In a sixth aspect, the present invention is a method of forming a silver particle ink, comprising forming stabilized silver particles; and dispersing the stabilized silver particles in an ink solvent.

DEFINITIONS

The symbol $\phi_{Ag}$ means the solid loading of metallic silver as weight percent of the composition.

The term "particle size" means the average of all diameters of the particle. The term "mean particle size" refers to the mean of the particles sizes for a collection of particles. Furthermore, the term "nanoparticle" means a particle have a particle size of less than or equal to 500 nm.

DETAILED DESCRIPTION

Figure 1:
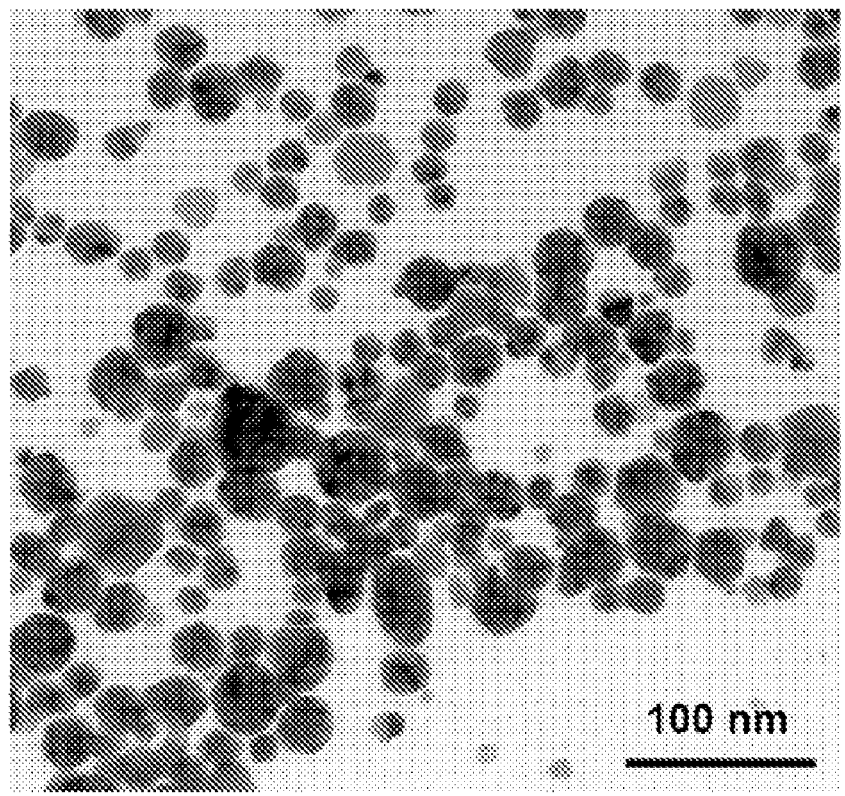
FIG. 1 is a transmission electron microscopy (TEM) image of silver particles (mean particle size of about 20 nm) grown in an aqueous $AgNO_3$ solution in the presence of poly (acrylic) acid as a stabilizing agent and diethanolamine (DEA) as a reducing agent.

The present invention makes use of the discovery of stabilized silver particles, and a concentrated silver particle ink containing the stabilized silver particles. Stabilized silver particles are silver particles containing adsorbed anionic polyelectrolytes. The silver particle ink contains the stabilized silver particles dispersed in an ink solvent. The silver particle ink may be used to form an ink filament or droplet by printing through a nozzle. A conductive electrode may then be formed by curing the ink. Preferably, the silver particle ink exhibits reliability in printing through fine nozzles (1-100 µm diameter) to form self-supporting conductive electrodes. The silver particle ink of the present invention makes possible, for the first time, the ability to prepare spanning, bendable, and stretchable electrodes and interconnect.

Stabilized silver particles are silver particles that preferably have a mean particle size of 5-500 nm, more preferably 10-50 nm, for example 15-25 nm, including 20 nm, which are stabilized by an adsorbed short-chain capping agent and an adsorbed long-chain capping agent. The capping agents are polymers containing anionic and/or acidic repeating units, preferably carboxylic acid and/or carboxylate moiety containing repeating units, such as poly(acrylic acid), poly(methacrylic acid), copolymers thereof and salts thereof. These polymers are referred to as anionic polyelectrolytes, which include both the anionic and protonated forms. Examples of anionic polyelectrolytes includes poly(acrylic acid), poly (methacrylic acid), poly(methyl methacrylate), poly(lauryl methacrylate), carboxymethyl ether, carboxyl terminated poly(butadiene/acrylonitrile), poly(butadiene/maleic acid), poly(butyl acrylate/acrylic acid), poly(ethylene glycol) monocarboxymethyl ether monomethyl ether, poly(ethylene/maleic acid), poly(maleic acid), poly(methyl methacrylate/methacrylic acid), poly(vinyl methyl ether/maleic acid), poly (vinyl methyl ether/monobutyl maleate), poly(vinyl methyl ether/monoethyl maleate), poly(vinyl methyl ether/mono-iso-propyl maleate), copolymers thereof and salts and mixtures thereof. The anionic polyelectrolytes, such as poly (acrylic acid) [$(CH_2C(O)OH)_n$, PAA], is used not only as a stabilizing agent but also as a binder, providing adhesion of inks on the substrates. The steric stabilization and multiple capping by the anionic groups, such as carboxyl (—COOH) groups from the PAA, provide long lifetime stability for the inks.

The short-chain capping agent has a molecular weight (Mw) of at most 10,000, such as 1,000-10,000, preferably 2,500-7,500, more preferably 4,000-6,000. The long-chain capping agent has a molecular weight (Mw) of at least 25,000, such as 25,000-100,000, preferably 30,000-80,000, more preferably 40,000-60,000. The weight ratio of the short-chain capping agent to the long-chain capping agent is preferably 5:95 to 95:5, including 10:90 to 90:10, and 20:80 to 80:20.

The silver particle ink contains the stabilized silver particles dispersed in an ink solvent. The ink solvent preferably contains water, and more preferably also contains a non-aqueous solvent which is soluble in water and has a higher boiling point than water, such as polyols, for example ethylene glycol, propylene glycol and glycerin. Preferably, the ink solvent contain a weight ratio of water:non-aqueous solvent of 5:1-1:5, more preferably 3:1-1:3. Preferably, the silver particle ink has a silver content (solid loading of metallic silver as weight percent of the composition) of at least 50 wt %, more preferably at least 60 wt %, and most preferably at least 70 wt %, such as 70-85 wt %, including 75 wt %, 77 wt %, and 82 wt %. The silver particle ink is shear thinning, i.e., apparent viscosity decreases with increasing shear rate. Furthermore, the silver particle ink has elastic (G') and viscous (G") moduli, such that G'≧1.5 G". Example silver particle inks are stable for at least two months at room temperature and are readily re-dispersible in water or ethylene glycol.

Figure 24:
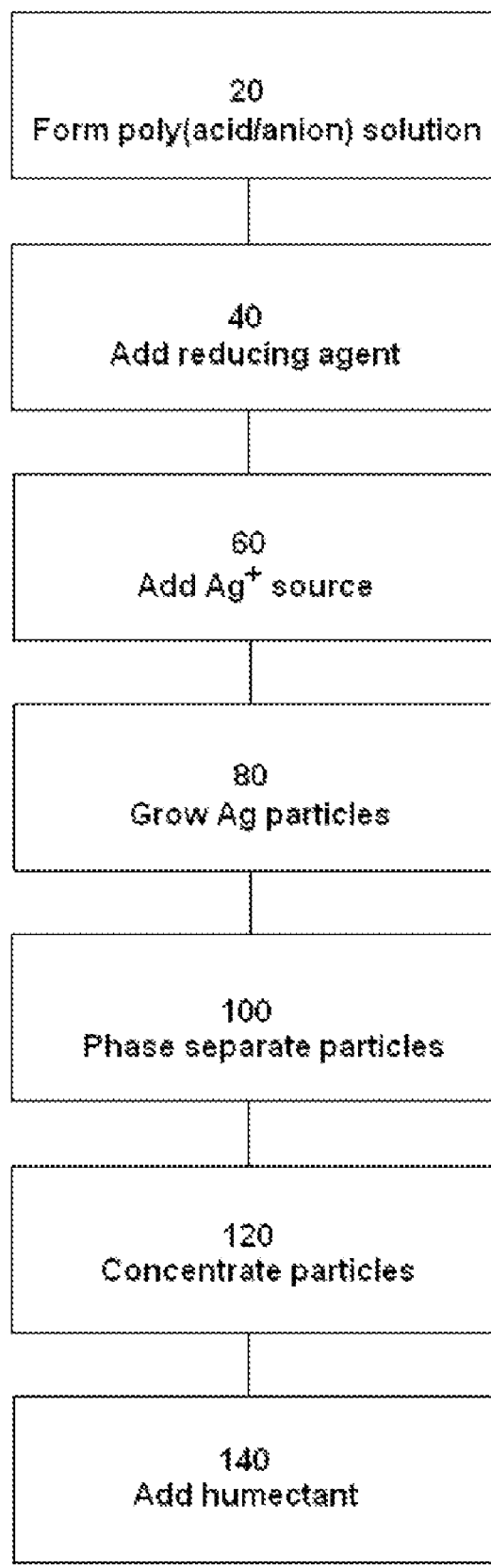
FIG. 24 is a flow chart of a process for preparing a silver particle ink.

A silver particle ink may be prepared by forming stabilized silver particles, concentrating the stabilized silver particles, and forming an ink from the particles. An example of the process is shown schematically in FIG. 24, with additional details below.

The stabilized silver particles may be formed, for example, by forming a solution of the short-chain and long-chain capping agents (20), adding a reducing agent (40), adding a source of $Ag^+$ (60), and growing the silver particles (80). The reducing agent is hydroxyl (—OH) group terminated amines, which are effective for producing stable silver particles with high concentration. Preferably short-chain hydroxyl group terminated amines, containing 2-10 carbon atoms, are used, since they are easy to evaporate during a curing step at low temperature (≦250° C.). Examples of short-chain hydroxyl group terminated amines include diethanolamine (DEA), 2-(methylamino)ethanol, 2-(butylamino)ethanol, bis(2-hydroxypropyl)amine, n-(2-hydroxyethyl)trifluoroacetamide, 2-(propylamino)ethanol, n-(2-hydroxyethyl)ethylenediamine, 2-(3-aminopropylamino)ethanol, ethanolamine, 2-(2-aminoethoxy)ethanol, 1-amino-2-propanol, 3-aminophenol, and 3-amino-1-propanol. Chemical formulas of these short-chain hydroxyl group terminated amines are shown in the table, below.

| | |
|---|---|
| Diethanolamine | $HO(CH_2)_2NH(CH_2)_2OH$ |
| 2-(Methylamino)ethanol | $HO(CH_2)_2NHCH_3$ |
| 2-(Butylamino)ethanol | $HO(CH_2)_2NH(CH_2)_3CH_3$ |
| Bis(2-hydroxypropyl)amine | $[CH_2CH(OH)CH_3]_2NH$ |
| N-(2-Hydroxyethyl)trifluoroacetamide | $HO(CH_2)_2NHCOCF_3$ |
| 2-(Propylamino)ethanol | $HO(CH_2)_2NH(CH_2)_2CH_3$ |
| N-(2-Hydroxyethyl)ethylenediamine | $HO(CH_2)_2NH(CH_2)_2NH_2$ |
| 2-(3-Aminopropylamino)ethanol | $HO(CH_2)_2NH(CH_2)_3NH_2$ |
| Ethanolamine | $HO(CH_2)_2NH_2$ |
| 2-(2-Aminoethoxy)ethanol | $HO(CH_2)_2O(CH_2)_2NH_2$ |
| 1-Amino-2-propanol | $CH_3CH(OH)CH_2NH_2$ |

-continued

| | |
|---|---|
| 3-Aminophenol | $HOC_6H_4NH_2$ |
| 3-Amino-1-propanol | $HO(CH_2)_3NH_2$ |

Hydroxyl group terminated amines, such as DEA, are effective in modulating the nucleation and particle growth in the stabilized silver particles, while the strong reducing agents, such as sodium borohydride ($NaBH_4$), hydrazine ($NH_2NH_2$), and aldehydes result in rapid large particle growth and aggregates. It is also expected that hydroxyl group terminated amines acts as a charge modulator of the carboxyl (—COOH) groups in PAA, which enables the highly concentrated ink to be stable and re-dispersible in water or ethylene glycol.

The source of $Ag^+$ may be any water-soluble silver compound, such as $AgNO_3$, $CH_3COOAg$, or $AgClO_4$. Growing the silver particles may be carried out by agitation of a dispersion of the particles, such as by stirring and/or sonicating, with or without heating.

For example, stabilized silver particles may be formed by (1) making an aqueous poly(acrylic) acid (PAA) solution by dissolving PAA with a molecular weight (Mw) of 5,000, and PAA with a molecular weight (Mw) of 50,000; (2) adding hydroxyl group terminated alkyl amine to the PAA solution; (3) adding $AgNO_3$ solution dropwise to the PAA solution; and (4) stirring at room temperature for 1-24 hours, followed by sonication for 2-5 hours at 60-100° C. to grow the silver particles.

Concentrating the stabilized silver particles may be carried out by addition of a solvent which does not wet the stabilized silver particles, but does form solutions with water. Examples include organic solvents such as ethanol, propanol and acetone. After addition, the stabilized silver particles will precipitate, and the particles may be separated from the supernatant (100 in FIG. 24). Further concentrating of the particles may be carried out by centrifugation (120 in FIG. 24). After concentrating, preferably the stabilized silver particles have a silver content of at least 50 wt %, more preferably at least 60 wt %, and most preferably at least 70 wt %, such as 70-85 wt %, including 75 wt %, 77 wt %, and 82 wt %. Addition of the ink solvent (such as a humectant, 140 in FIG. 24), followed by homogenization, and optionally vacuum treatment and/or aging for 1-3 days, completes formation of the silver particle ink.

Each part is now described in further detail.

(1) It is known that the ink resistivity increases with increasing PAA content. Less than 10 wt % PAA is sufficient for stability and is recommended. Molecular weight (Mw) of PAA plays an important role on the ink properties, such as printability, resistivity, drying mechanics, and adhesion. Molecular weight of 5,000 (5K) to 50,000 (50K) is recommended. Particle size of inks decreases with increasing Mw of PAA due to steric hindrance during particle growth but more than 50K shows sponge-like bulky networks resulting in bad printability and conductivity. Inks from 50K PAA show good printability, good adhesion to substrate but they result in higher resistivity than that from 5K PAA. Inks from 5K PAA display high conductivity but poor adhesion to a substrate, as well as crack formation during drying, and bad printability due to nozzle clogging by rapid drying. Nozzle clogging occurs even after adding a high content (~10 wt %) of high boiling point solvent like ethylene glycol (EG). The best case is obtained from a mixed PAA system of 5K:50K=80:20 in wt %. In this case, 5K gives high conductivity and 50K regulates ink flow properties, adhesion, drying, and elasticity.

(2) PAA ionizes in an aqueous solution at pH 8.5-10. Inhomogeneous precipitates result when using pH below 8.5. pH≧9.5 is recommended. Hydroxyl group terminated alkyl amine is used as a pH controlling agent as well as a mild reducing agent. Advantages of this kind of reducing agent include (1) easy control of particle size by slow growth rate, (2) free of alkali metal impurities, and (3) good solubility in both water and alcohol. Diethanolamine (DEA) is ideal.

(3) $AgNO_3$ is an inexpensive and soluble precursor in aqueous solution. 25-65 wt % solution is recommended. The ink product reduces below this range or inhomogeneous coagulates may result above this range during addition due to high concentration. Drop-wise addition is recommended because fast addition may cause large agglomerates. The reaction is exothermic, so the use of a water bath is recommended.

(4) Particle growth at room temperature halts at ~5 nm size upon stirring ~24 h. Further growth of particles to 10-500 nm mean particle size is enhanced by elevated reaction temperatures up to 100° C. Sonication is useful for homogeneous particle grow. Stirring on a hot-plate causes inhomogenously grown precipitates to segregate along the reactor wall. Reaction for 2-5 h at 60° C. is recommended to obtain ~20 nm. High temperature may shorten reaction time but longer reaction time may cause inhomogeneous, large particles. Particle size plays an important role on electrical resistivity of the inks. Inks composed of small particles less than 10 nm show high resistivity due to strong capping and steric hindrance, preventing percolation. A particle size more than 20 nm is recommended to obtain ink with high conductivity that maintains a low sintering temperature (≦250° C.). Large particles above 50 nm suffer from nozzle clogging through nozzles ≦5 μm, because of jamming effects, but can be printed through larger nozzles.

(5) Because fine particles are dispersed in viscous solution, it is not possible to collect them even using high speed centrifugation (≧10,000 rpm). Phase separation by liquid extraction is used to collect the particles. Ag particles are highly soluble in water but they are phase-separated with addition of poor solvents, such as alcohol or acetone. Titration is recommended to control uniform formation of flocculants.

(6) The flocculated particles precipitate within 30 min. They are collected by decanting supernatant, followed by centrifugation at 9,000 rpm for 20 min. A highly concentrated ($\phi_{Ag}$≧75 wt %) bluish precipitate is obtained. High speed centrifugation at more than 4,000 rpm is recommended to get high solid content.

(7) It is important to carefully tune the ink chemistry for good printability, redispersibility, and stability at room temperature. The centrifuged precipitate can be used as an ink itself, but further optimization is required for producing a more reliable ink. The precipitate is homogenized by adding preferably 2-10 wt % of wetting solvent (ink solvent; $H_2O$:EG=1:1-3:1 in wt ratio), vacuumed ~30 min to remove trace amount of nonwetting solvents and fine bubbles, followed by aging at room temperature ~3 days. After optimization, the bluish inks turn to purple and provide better printability and reliable ink flow.

Factors affecting the properties of the silver particle inks include the following: silver concentration affects self-supporting behavior, conductivity and viscosity. Molecular weight of surface capping agent affects viscosity, stability, and drying dynamics of printed electrodes. The amount and type of reducing agent affects the pH, particle growth size and speed, and stability.

Filaments, droplets and other structures may be formed by DIW. The filaments, droplets and other structures may be cured by heating to enhance conductivity, forming a conductive structure. Preferably, curing is carried out by heating at temperatures of 150-550° C., preferably 150-250° C. The silver particle ink has a wide range of application in the field of microelectronics, and can be used to form various electronic devices, such as displays, chemical reactors, solar cells, RFIDs, antennas, metamaterials, and sensors.

EXAMPLES

Figure 2:
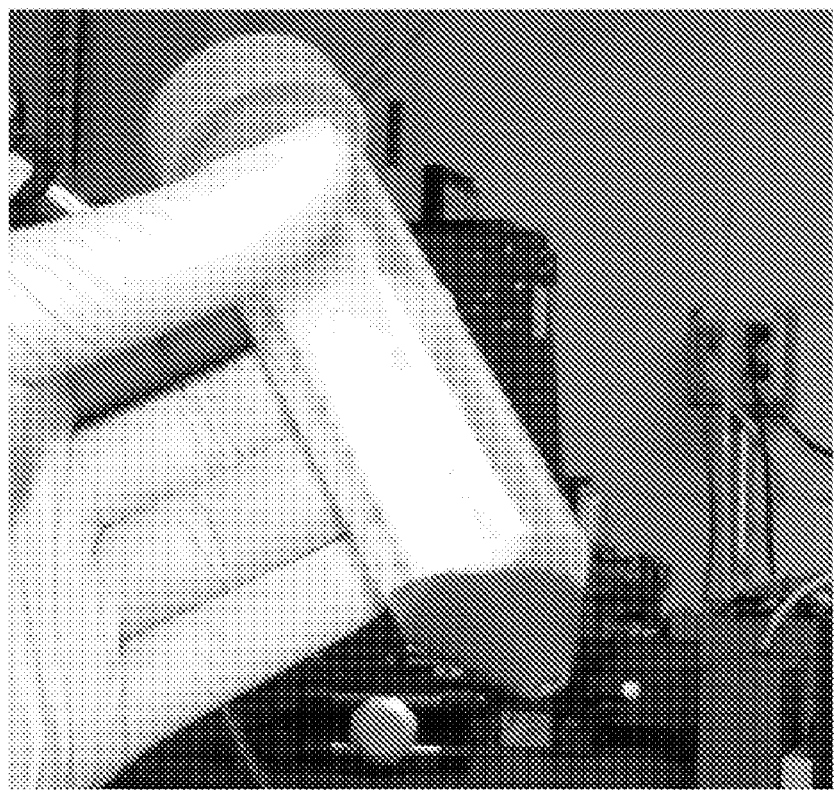
FIG. 2 is an optical image of the silver particle ink ($\phi_{Ag}$=77 wt %, PAA/(Ag+PAA)=10 wt %).
Figure 5:
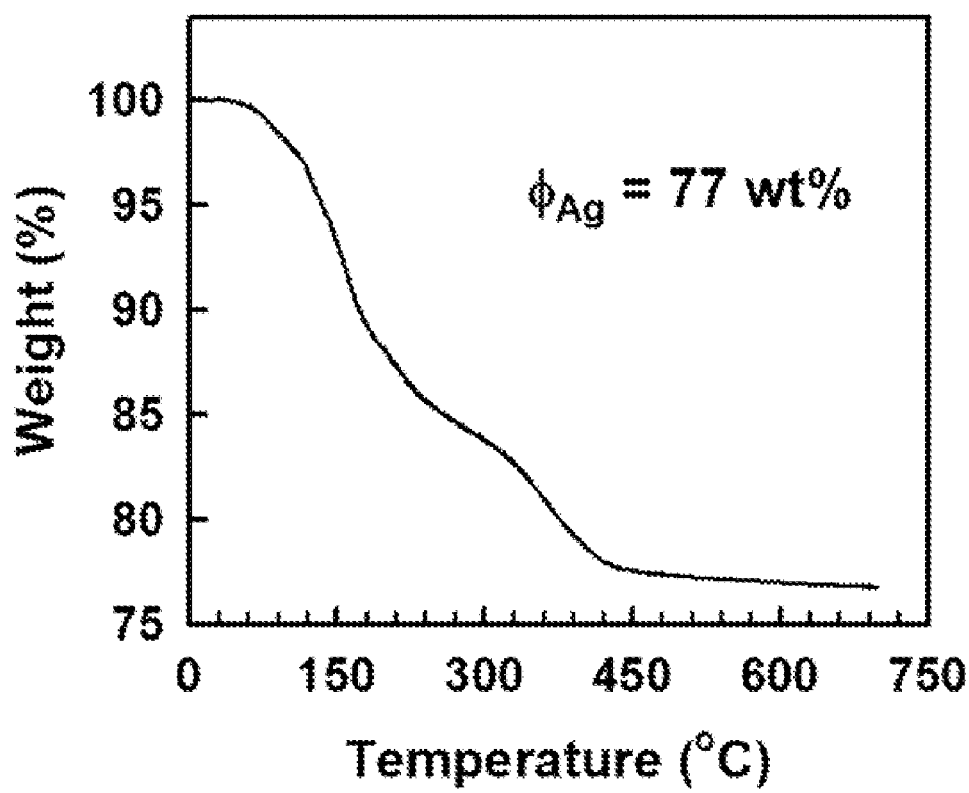
FIG. 5 is a graph produced from thermogravimetry analysis (TGA) of the silver ink ($\phi_{Ag}$=77 wt %, PAA/(Ag+PAA=10 wt %) measured in air.

A highly concentrated ($\phi_{Ag}$=77 wt %), poly(acrylic acid)-stabilized (PAA/(Ag+PAA)=10 wt %) silver particle ink in aqueous solvent (FIG. 2) was formed as follows. 1.99 g poly(acrylic acid) (PAA) (Mw 5,000, 50 wt % aqueous solution), 1.0 g PAA (Mw 50,000, 25 wt % aqueous solution), and 40 g diethanolamine (DEA) are dissolved in 50 ml of $H_2O$ by stirring 2 h in a water bath at room temperature (DEA/Ag=2.65 in molar ratio, PAA/(Ag+PAA)=10 wt %). The pH of the solution is 9.5, in which PAA is fully ionized. Silver nitrate solution (20 g $AgNO_3$ in 20 ml $H_2O$) is added to the PAA solution under vigorous stirring. The resulting reddish yellow solution is gently stirred for 24 h at room temperature. The solution exhibits gradual color change from reddish yellow to dark black, indicating a mean particle size ~5 nm. Particles are grown further by sonicating the solution in a heated water bath (60° C.) for 2 h After this treatment, the mean particle size is ~20±5 nm with a total size distribution between 5-50 nm. The particles are concentrated by titrating (10 ml/min) 240 ml ethanol. Ethanol is a nonwetting solvent which causes the particles to coagulate and precipitate from solution. After decanting the supernatant, the coagulated mass is centrifuged (9,000 rpm, 20 min) to remove remaining solvent and recover the precipitate. The process yields a highly concentrated ($\phi_{Ag}$=77 wt %, see TGA in FIG. 5) and stable paste of silver particles. The resultant paste is homogenized by adding ~5 wt % of wetting solvent ($H_2O$:EG=2:1 in wt) and vacuuming ~30 min to remove trace amount of nonwetting solvents and fine bubbles. The ink is typically aged for 3 days at room temperature prior to use. After homogenization, the bluish paste turns to purple. Homogenized ink displays extremely reliable printability through fine nozzles 5 μm~30 μm. The silver particle ink is stable at room temperature for at least two months and it is readily re-dispersible in water or ethylene glycol.

Particle size is tuned by adjusting pH and PAA molecular weight, but the dominant effects are temperature and reaction time, which are both carefully controlled upon addition of reducing agent to silver salt ($AgNO_3$). FIG. 1 shows silver particles extracted from the ink for TEM imaging, exhibiting a mean particle size ~20±5 nm with a size distribution between 5-50 nm. This range of particle sizes appears to be optimal for high conductivity and good printability through fine nozzles. The ink is synthesized at pH≧9 to ensure the adsorbed PAA chains are charged, which inhibits formation of particle aggregates that would jam the nozzle orifice. The ink is concentrated and collected from aqueous solution by coagulating in a poor solvent (e.g. acetone or EtOH) for PAA and then centrifuging. After centrifugation, a small amount of poor solvent remains in the inks, thus creating an ink that consists of stabilized particles with a globular coating of polymer that adds stiffness. Finally, a small amount of humectant (e.g., ethylene glycol) is incorporated to prevent drying induced clogging commonly observed in inkjet inks. Under these conditions, the sealed ink has been stored at room temperature for over two months without any noticeable decline in printing behavior.

Figure 6:
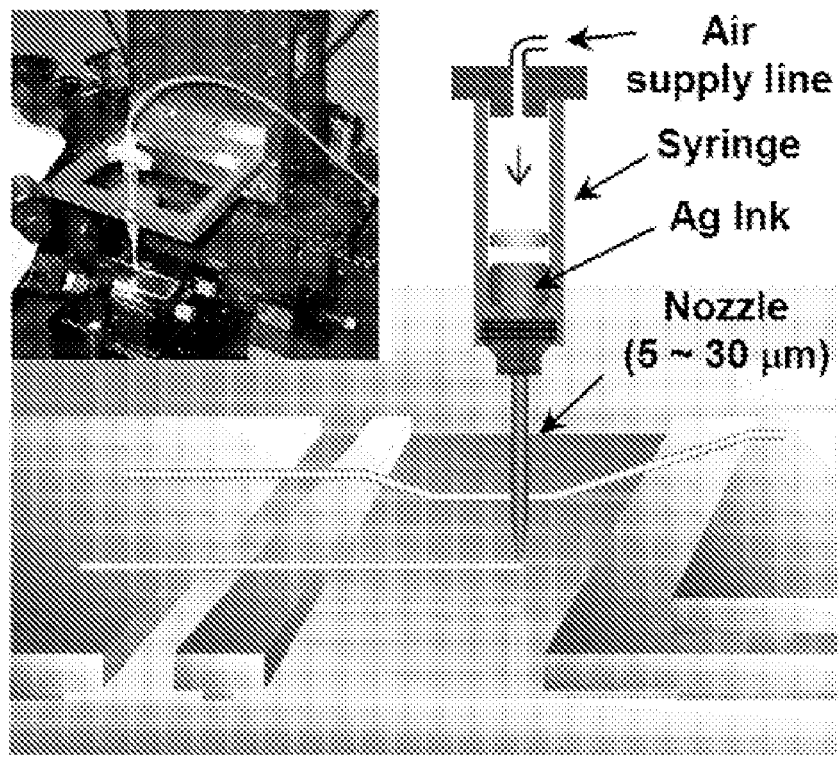
FIG. 6 is a schematic diagram illustrating direct ink writing (DIW) of the silver particle ink. The inset shows an optical image of a DIW apparatus.

The ink is well suited for producing fine scale (widths=5-30 μm) self-supporting microelectrodes by DIW (FIG. 6).

DIW is carried out using a robotic deposition apparatus (ABL 900010 x-y-z motion stage, Aerotech Inc., Pittsburgh, Pa.) controlled with custom computer-aided design software (RoboCAD, 3D Inks, Stillwater, Okla.). The silver ink is housed in a syringe (3 mL barrel, EFD Inc., East Providence, R.I.) attached by luer-lok to a borosilicate micronozzle (diameter=5-50 µm, P-2000 laser based micropipette puller, Sutter Instrument Co., Novato, Calif.). An air-powered fluid dispenser (800 ultra dispensing system, EFD Inc.) is used to pressurize the barrel and control ink flow rate. The required pressure depends upon ink viscosity, nozzle diameter, and printing speed, but typically ranges from 10-100 psi at 50-500 µm s$^{-1}$. The deposition process is performed under ambient conditions with a relative humidity of ~20-30% at room temperature (23-26° C.).

Figure 3:
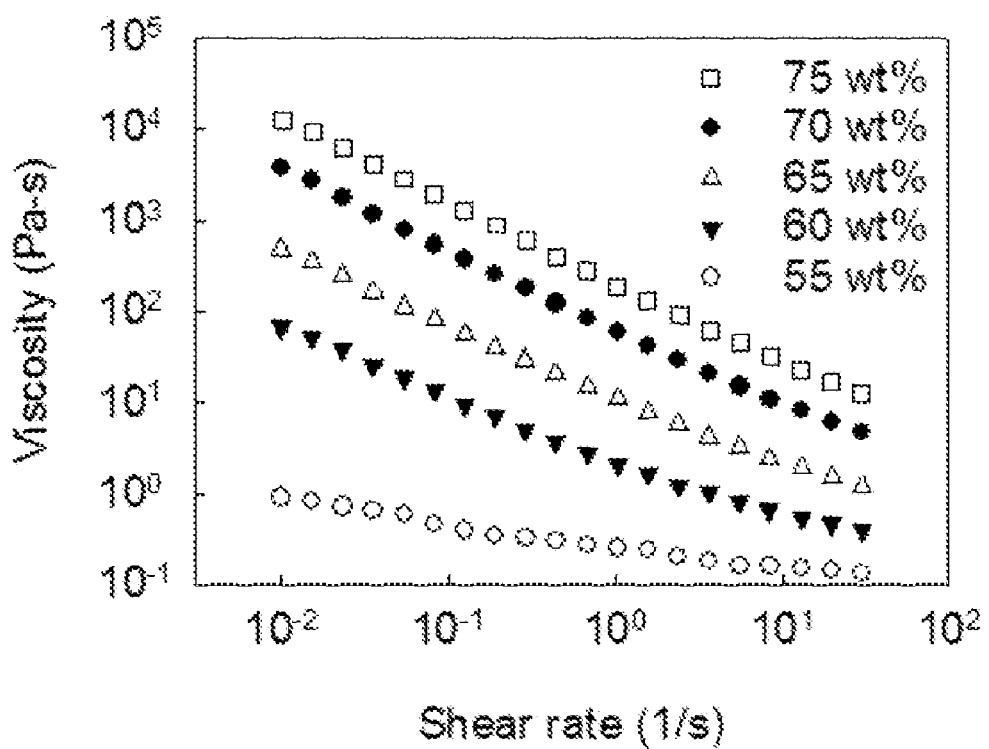
FIG. 3 is a graph of apparent viscosity as a function of shear rate for silver particle inks of varying solids loading ($\phi_{Ag}$=55-75 wt %, PAA/(Ag+PAA)=10 wt %).
Figure 4:
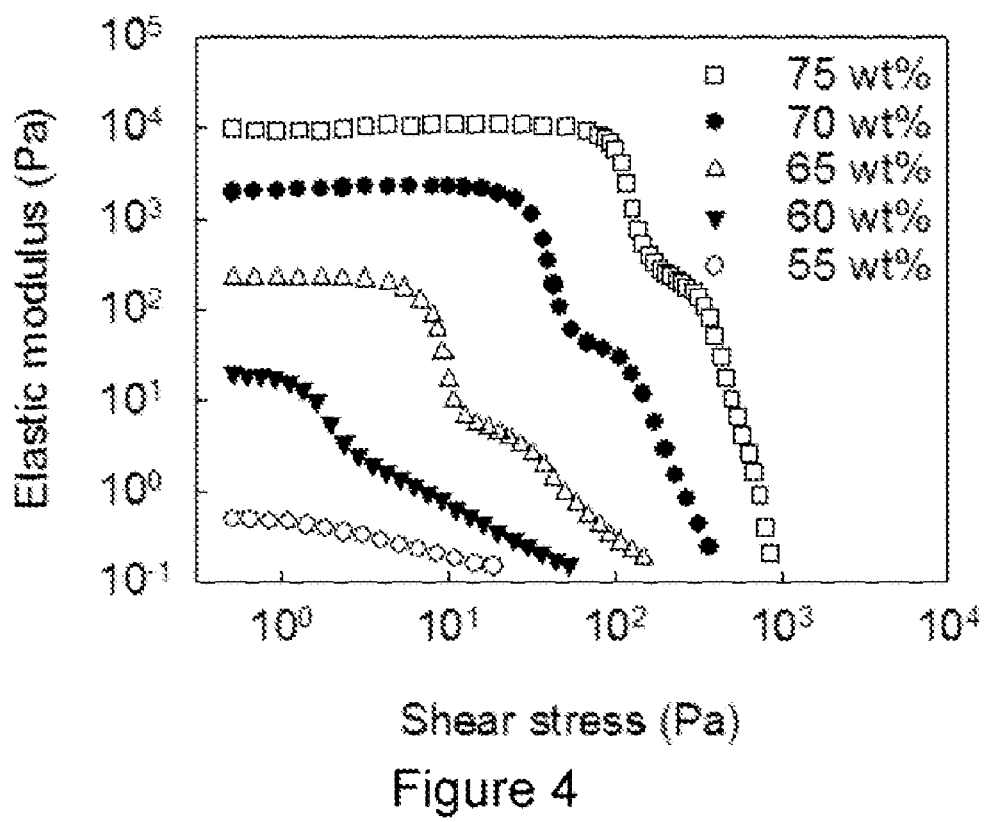
FIG. 4 is a graph of shear elastic modulus (G') as a function of shear stress for the silver particle ink of varying solids loading ($\phi_{Ag}$=55-75 wt %, PAA/(Ag+PAA)=10 wt %) as a function of shear stress.

Unlike inkjet printing, direct ink writing relies on air pressure (10~100 psi) driven extrusion of inks. Both the ink viscosity and elasticity under shear flow are critical parameters that must be optimized to enable patterning of self-supporting, filamentary microelectrodes. FIG. 3 shows the apparent viscosity (η) as a function of shear rate for inks of varying solids loading. The low-shear, apparent viscosity (η) rises nearly four orders of magnitude as the solids loading ($\phi_{Ag}$) increases from 55-75 wt %. Concomitantly, there is a pronounced increase in the shear thinning behavior observed. A similar rise in the elastic modulus (G') is observed with increasing solids loading, as shown in FIG. 4. To produce self-supporting features via DIW, the ink preferably contains a minimum solids loading of 70 wt %, which corresponds to a minimum G' of 2,000 Pa. From experimental observation, it is known that G'>G", preferably G'≧1.5 G", is required to produce self-supporting features. Upon exiting the nozzle, the ink rapidly solidifies as the aqueous solvent evaporates, forming a continuous filamentary shape, and therefore preventing wetting or spreading that are deleterious to achieving small feature sizes.

Figure 7:
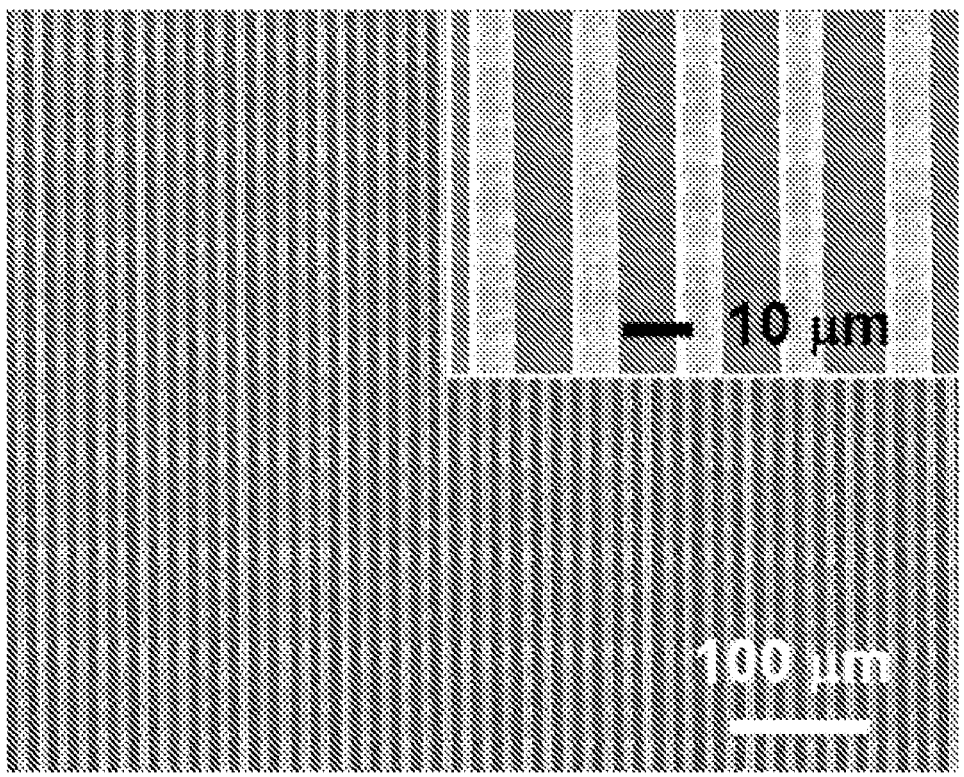
FIG. 7 is a scanning electron microscopy (SEM) image of an array of silver microelectrodes (width 6 µm, height 3.7 µm, spacing 15 µm) printed on a silicon wafer by a nozzle with 5 µm orifice. DIW conditions: 50 µm/s, 40 psi, RH 23%, 24° C. Inset shows the magnified SEM micrograph.

To demonstrate fine scale and high aspect ratio printing, a planar pattern of silver microelectrodes (width 6 µm, height 3.7 µm, spacing 15 µm) is printed onto a silicon wafer from a nozzle with 5 µm orifice (FIG. 7). The high aspect ratio (height/width≧0.6) is obtained by single-step deposition, unlike droplet-based printing methods which would require multi-step printing and heat treatments to achieve similar aspect ratios.[17] Furthermore, the deposited electrodes display uniform drying and solidification with a notable absence of any "coffee ring effect",[18] which commonly plagues ink-jet printing.

Figure 8:
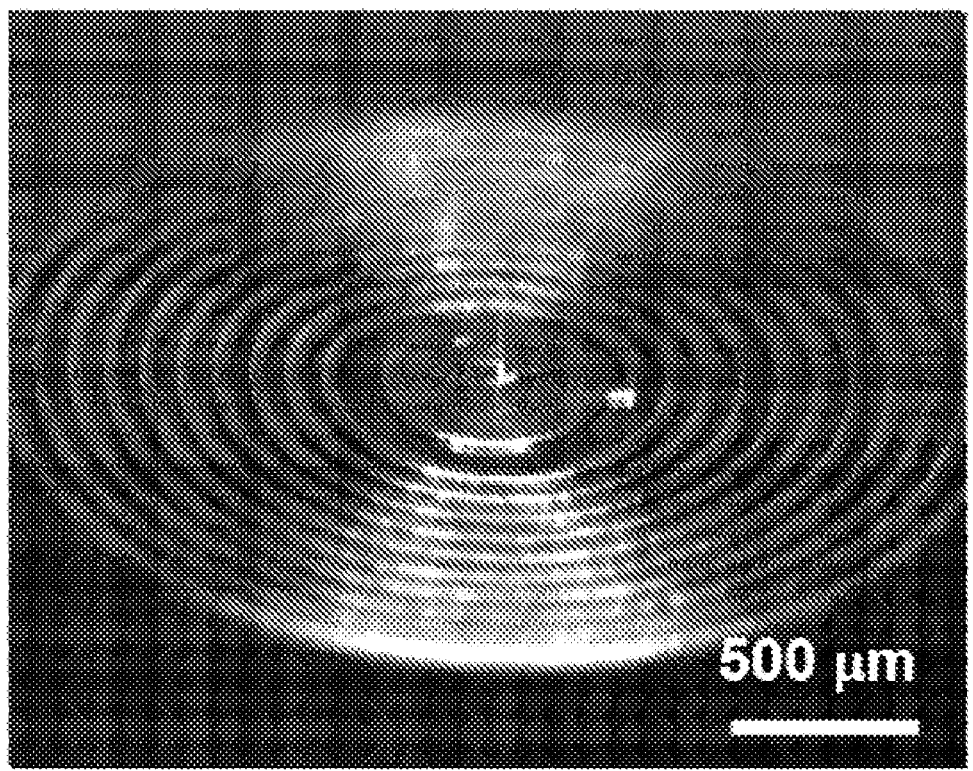
FIG. 8 is an optical micrograph of a resonant inductive coil printed on a silicon wafer by 30 um nozzle.
Figure 14:
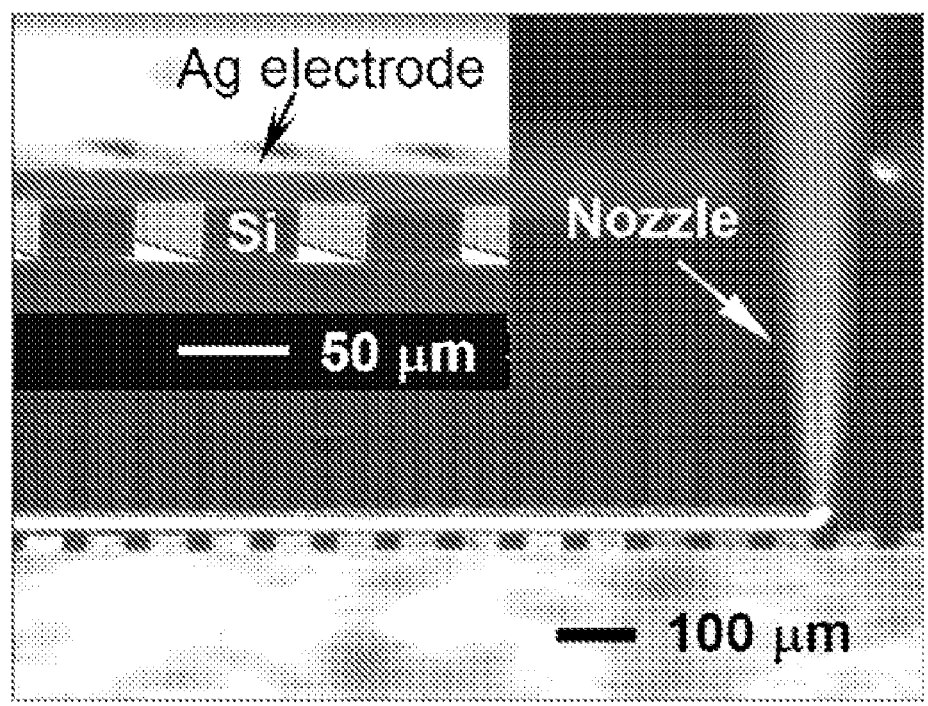
FIG. 14 is an optical micrograph of the spanning silver electrode (width 15 µm, height 13 µm) printed on an array of unplanarized silicon microribbons (width 45 µm, height 26 µm, spacing 33 µm). DIW conditions: $\phi_{Ag}$=77 wt %, 10 µm nozzle, 70 µm s$^{-1}$, 65 psi, RH 23%, 24° C.). The inset shows the magnified SEM micrograph.

With this approach, it is possible to fabricate conductive structures of arbitrary complexity whose geometries are applications driven. For some relevant applications, the conductive architecture may itself be the desired device (e.g., antennas, metamaterials). For others, direct ink writing of silver particle ink may be used in conjunction with other processes (e.g., photolithography, transfer printing, etc.) for heterogeneous integration of dissimilar materials. An example of the former case is shown in FIG. 8, wherein a resonant inductive coil is printed onto a silicon wafer by a 30 µm nozzle, demonstrating feasibility for printing of RFIDs. An example of the latter case is shown in FIG. 14, wherein silver microelectrode interconnects are printed onto an array of silicon ribbon solar cells (width 45 µm, height 26 µm, spacing 33 µm) planarized by photocurable polymer (NOA-61).

Figure 9:
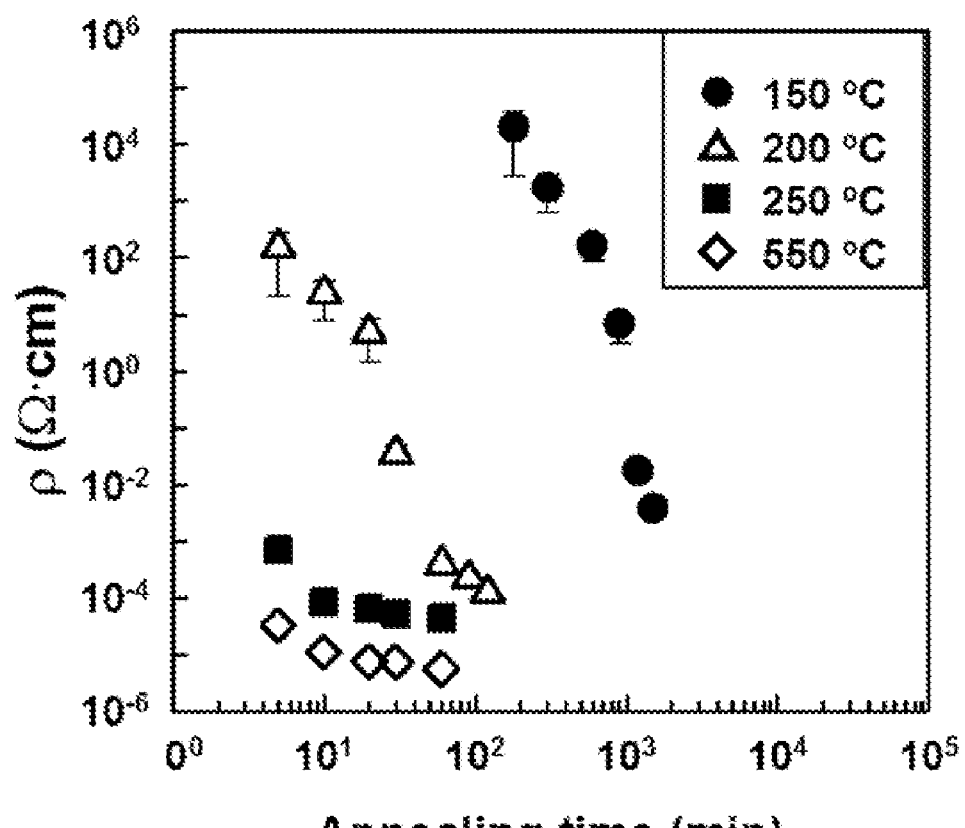
FIG. 9 is a graph of resistivity of the printed silver electrodes as function of heat treatment time and temperature.
Figure 10:
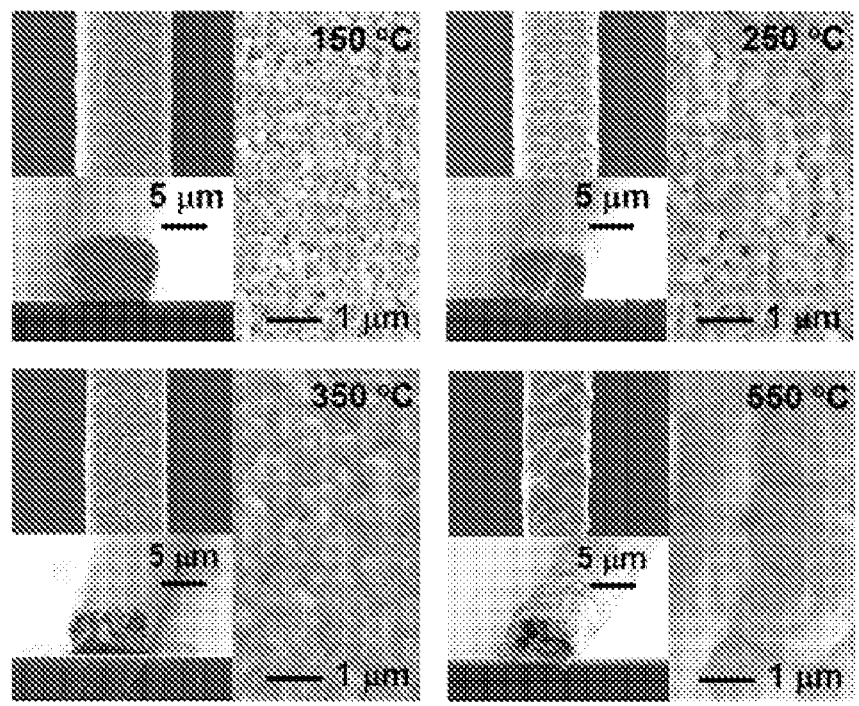
FIG. 10 is a set of SEM micrographs of silver electrodes heat treated to: (from top left) 150° C., 250° C., 350° C., and 550° C. Each image shows the electrode width (top left), height (bottom left), and surface morphology (right) for a sample heated to the indicated temperature.

The resistivity of printed silver traces as a function of heat treatment time and temperature is shown in FIG. 9. The volume resistivity of the electrodes is obtained via the equation ρ=(R·A)/L, where ρ is volume resistivity (Ω·cm), R is resistance (Ω), A is cross-sectional area (cm$^2$), and L is length of the electrode (cm).[19] The resistivity of the electrodes decreases with increasing heat treatment time. A resistivity (10$^{-5}$ Ω·cm range) close to the value of bulk silver (10$^{-6}$ Ω·cm) is obtained by short cure times (≦10 min) above 250° C. By contrast, long cure times (≧30 h) are required to obtain 10$^{-3}$ Ω·cm range of resistivity at 150° C. Low resistivity after heat treatment at low temperature is attributed to the high concentration of metallic silver, low content of stabilizing agent (PAA), as well as the size effect of particles which enables consolidation at low temperature due to diffusion.[20, 21] Resistivity results correspond well with the morphology characteristics as a function of curing temperature (FIG. 10). Width and height of the electrode reduce up to 30% and grain sizes increase from nanometer scale to several microns after heat treating to 550° C. The high magnification SEM images display a transition to a sintered surface morphology after heat treating to temperatures above 250° C.

One important advantage of using highly concentrated silver nanoparticle inks to create printed microelectrodes is their compatibility with both wetting and non-wetting substrates, including silicon, polyimide, and silicone surfaces. Unlike, inkjet printing, which greatly suffers from dewetting phenomena,[5] these inks exhibit infinite viscosity under zero-shear conditions (i.e., after exiting the deposition nozzle) thereby suppressing this phenomena.

Figure 11:
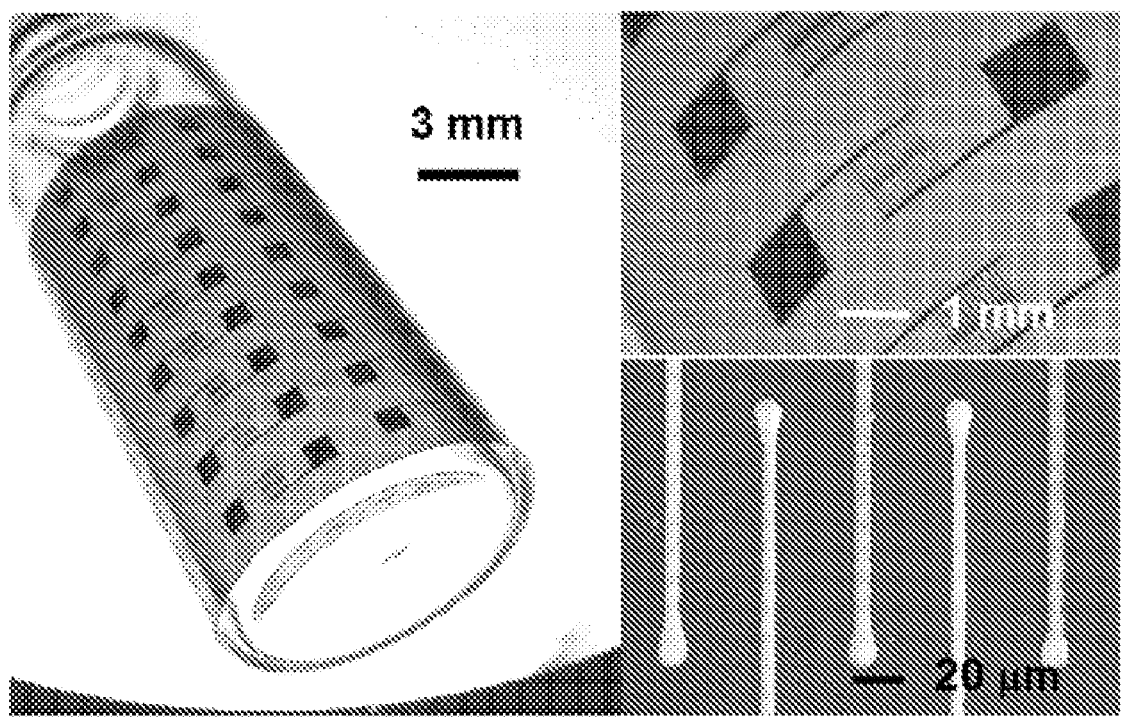
FIG. 11 is optical images of the bendable silver electrodes printed on polyimide sheet, heat treated to 200° C. for 3 h, and wrapped around a vial with bending radius of 14 mm. (Top right) Optical image of electrode pads, conducting features, and interdigitated conducting hairs. (Bottom right) Magnified SEM micrograph of the fine interdigitated silver hairs.

Low temperature heat treatment indicates this ink and printing approach are compatible with flexible polymer substrates such as polyimide. FIG. 11 shows optical images and an SEM micrograph of a bendable silver pattern printed onto a 25 µm thick polyimide sheet, followed by heat treatment to 200° C. for 3 h, and subsequent wrapping onto a scintillation vial with a bending radius of 14 mm. Stop and run ink flow is employed to create disconnected architectures as well as patterned areas of different feature sizes. Contact pads (1 mm×1 mm) are printed with a 30 µm nozzle by programming the line spacing≦nozzle diameter, resulting in a continuous region of merged ink (FIG. 11 top right). Fine interdigitated electrodes are printed by a 5 µm nozzle onto an electrode backbone of 30 µm width, illustrating the ability to produce elaborate structures with stop and run printing (FIG. 11 bottom right).

Figure 12:
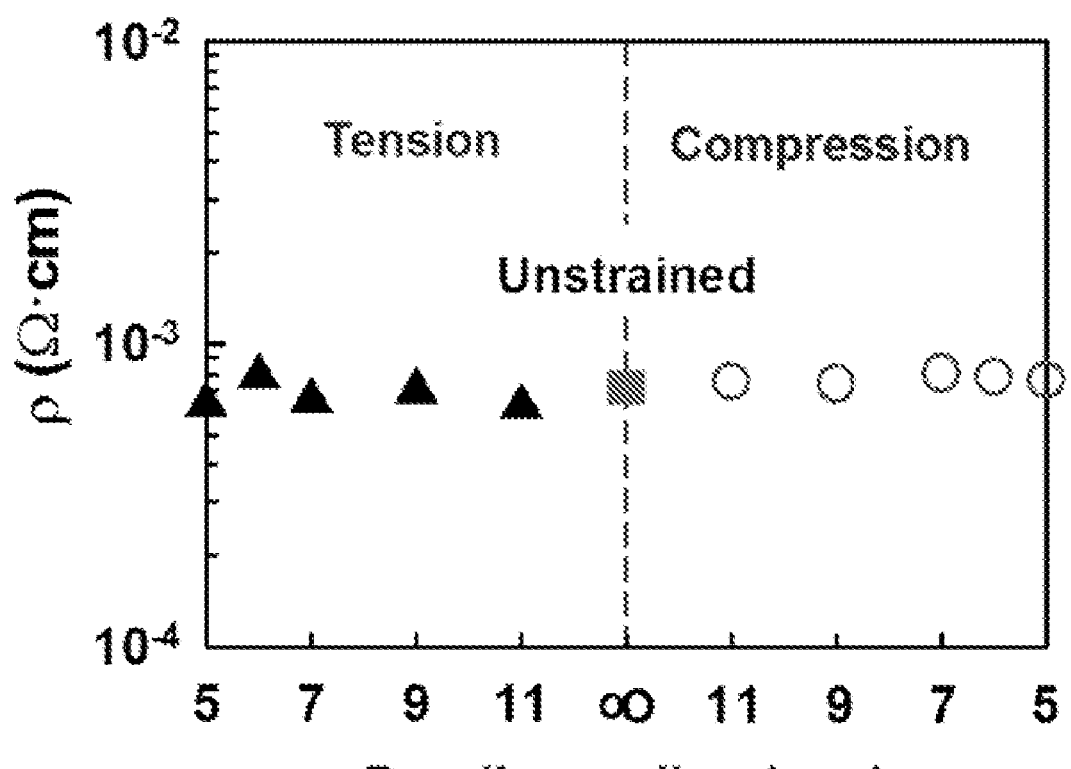
FIG. 12 is a graph of resistivity of the silver electrodes as a function of bending radius under tension, compression, and the unstrained state.
Figure 13:
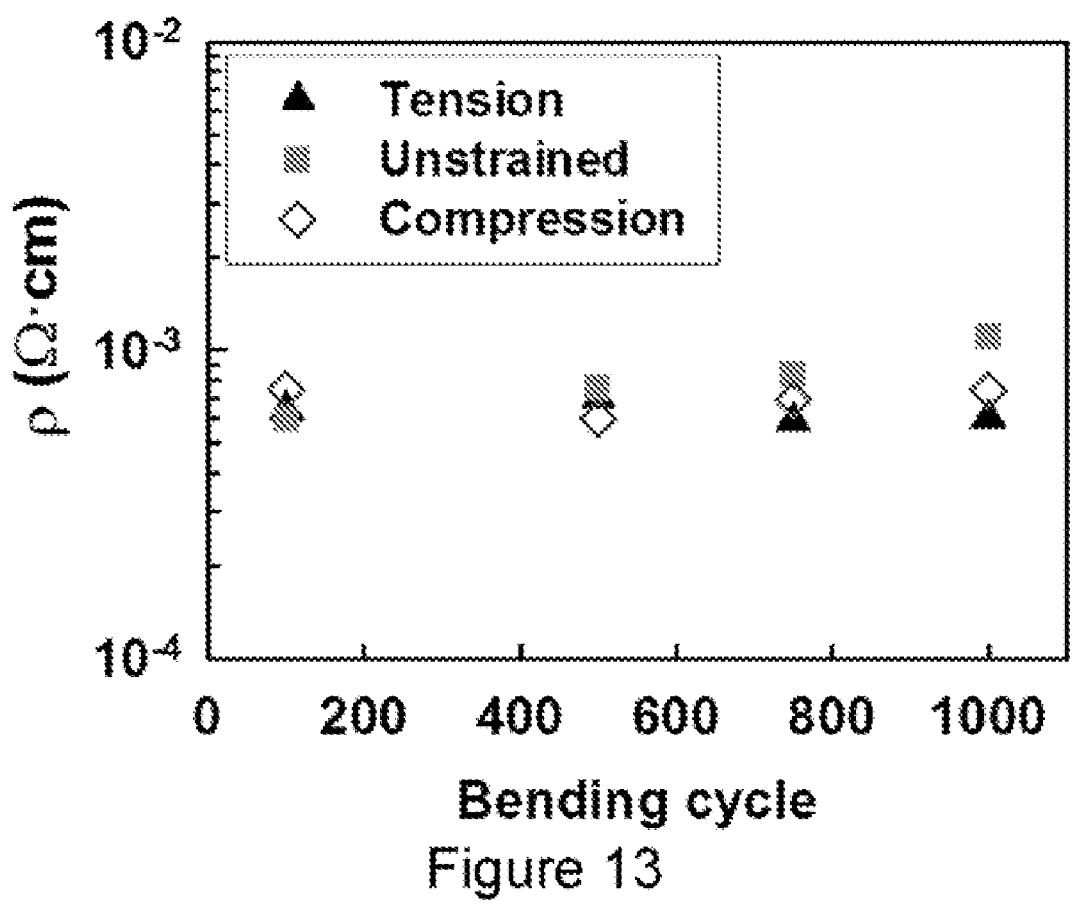
FIG. 13 is a graph of resistivity of silver electrodes as a function of bending cycle. One cycle is defined as bending through a series of tension, unstrained, compression, and unstrained states.

To examine the bendability of silver microelectrodes printed onto flexible substrates, bend tests using a specially designed mechanical stage were performed on a silver electrode (width 21 µm, height 15 µm, length 2 cm) cured at 200° C. for 3 h in ambient air. Resistivity of the electrode as a function of bending radius is shown in FIG. 12, for tension (convex surface), the unstrained state (flat surface), and compression (concave surface). No significant variations of resistivity are observed, even upon bending from a radius of 11 mm to 5 mm. Fatigue studies of repetitive bending up to 1,000 cycles (one cycle-flat-tension-flat-compression-flat) at the smallest bending radius of 5 mm confirm the bendable nature of conductive silver microelectrodes (FIG. 13).

Figure 15:
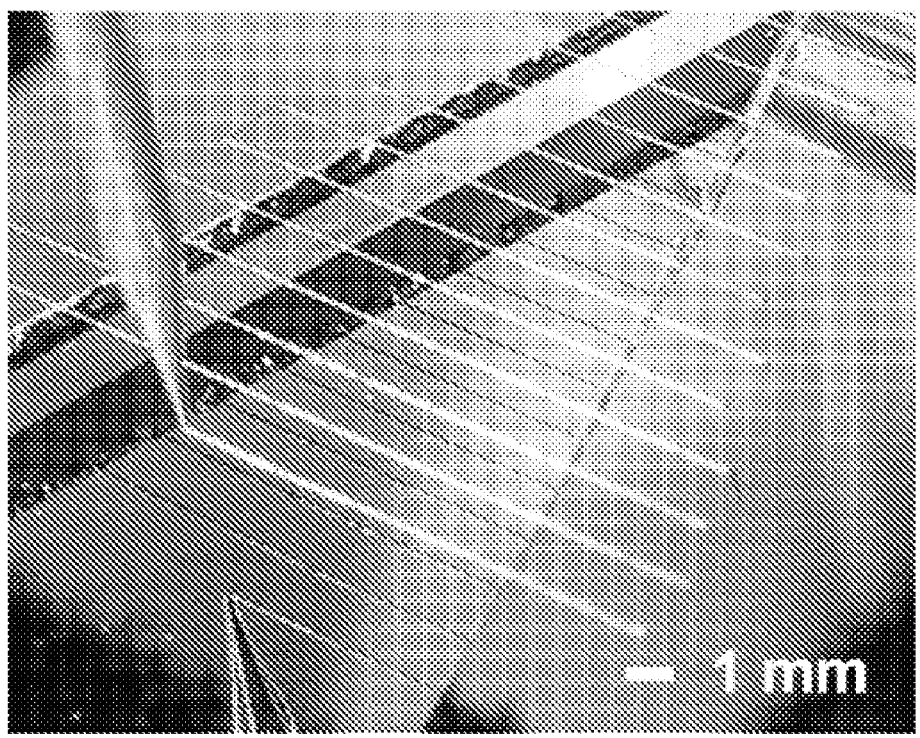
FIG. 15 is an optical image of the spanning silver electrodes printed over a wedge-shaped gap with 1 mm height difference between top and bottom surfaces.
Figure 16:
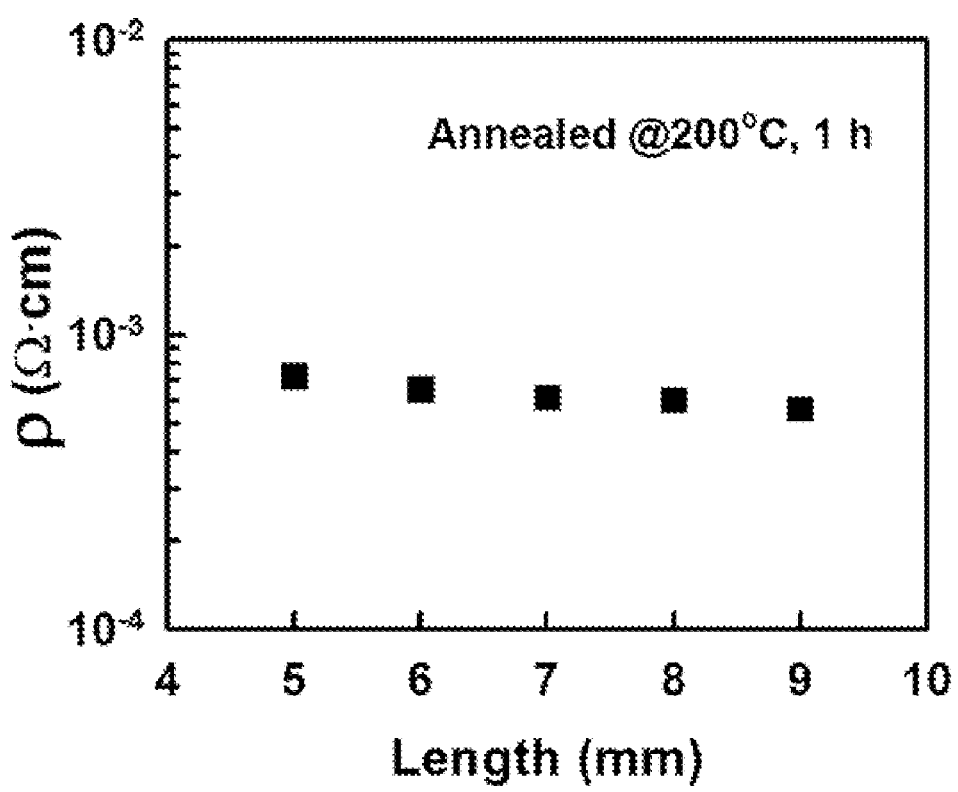
FIG. 16 is a graph of resistivity (ρ) of the spanning silver electrodes as a function of length.
Figure 17:
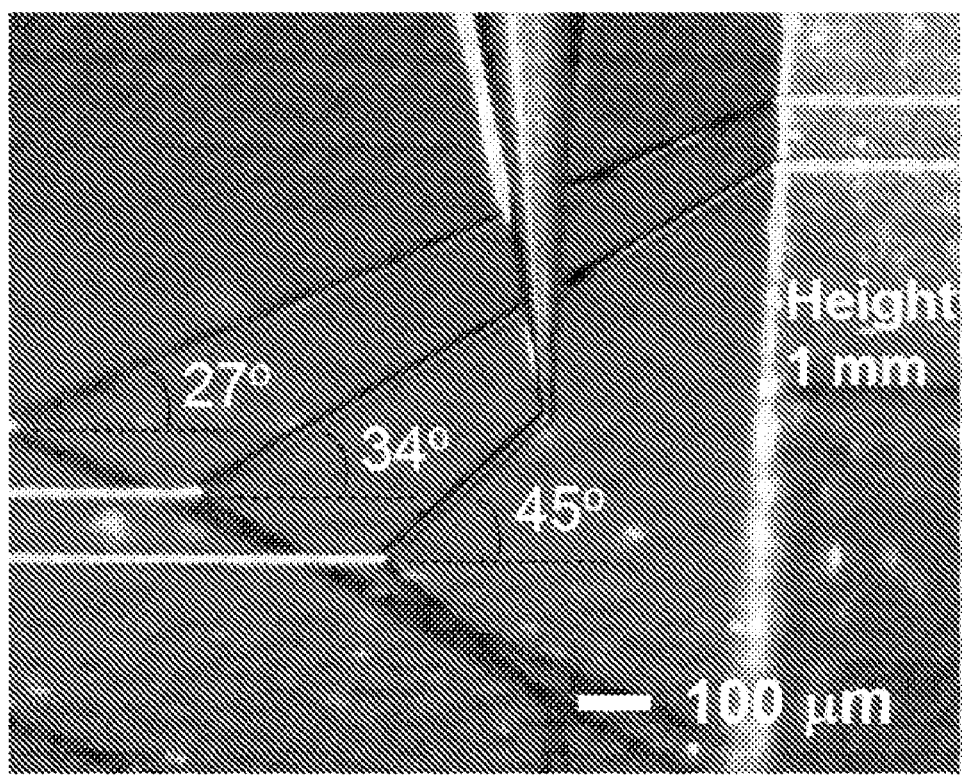
FIG. 17 is an optical micrograph acquired during vertical printing between two substrates with 1 mm height difference at varying printing angles.
Figure 18:
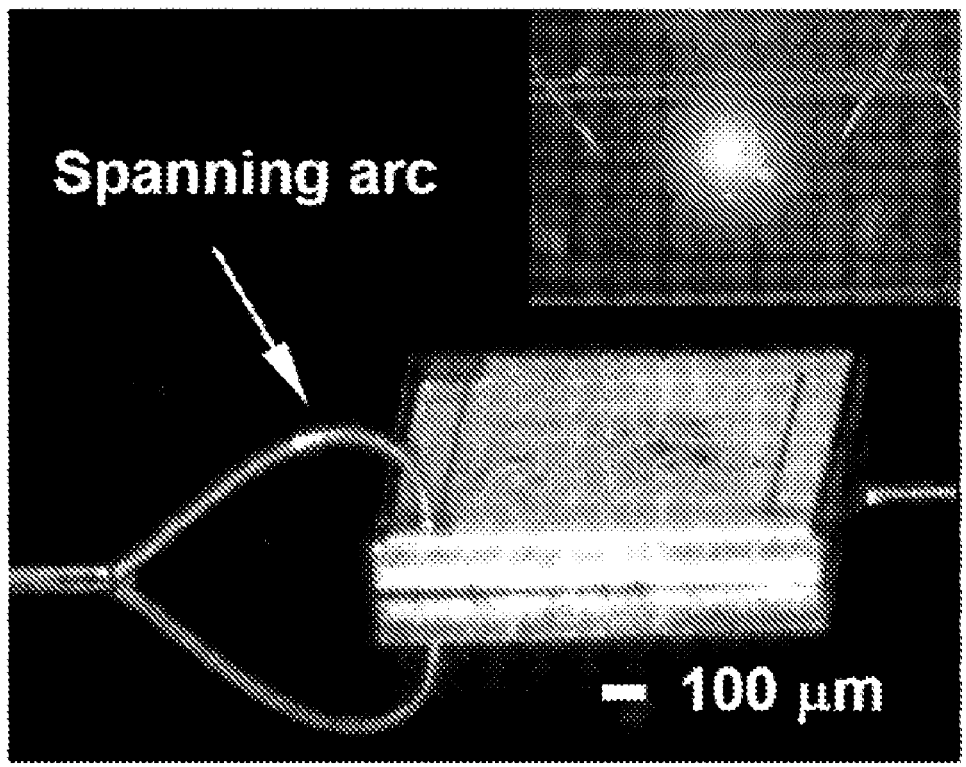
FIG. 18 is an optical micrograph of an LED chip (1 mm×1 mm×200 µm) connected to a voltage source via a spanning arc (top contact) and linear wire (bottom contact) printed with silver ink (heat treated to 200° C. for 3 h). Inset shows blue emission after connecting to a voltage source with an applied bias of 2.0 V.
Figure 19:
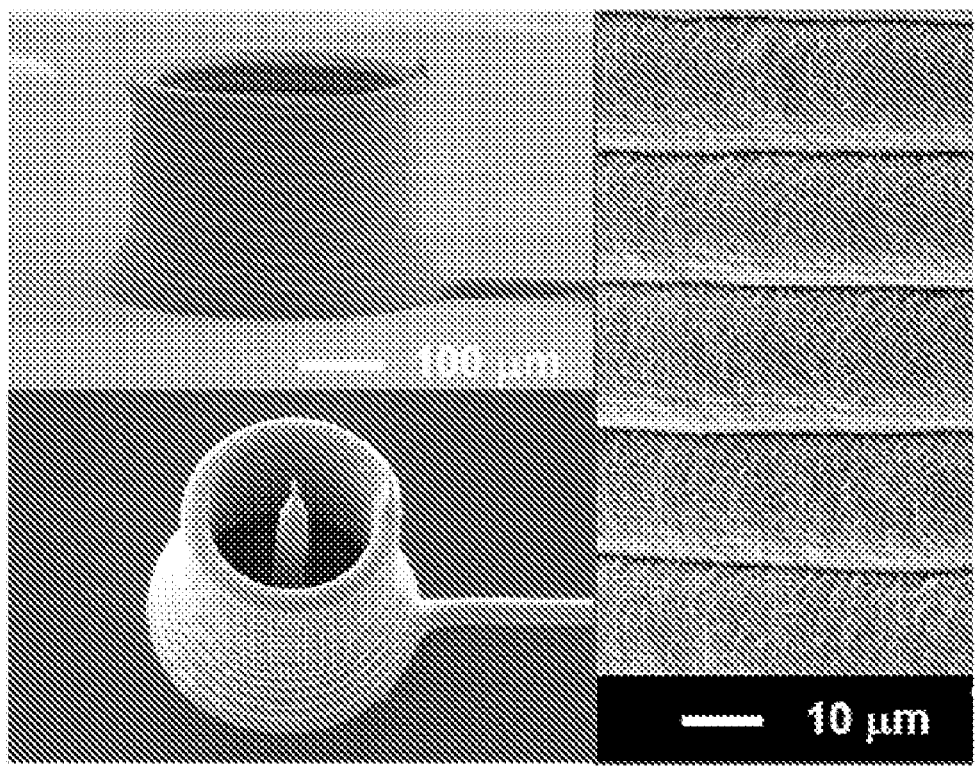
FIG. 19 is SEM micrographs of a cylinder (top left), a cylindrical microcapacitor with a vertically printed spike in the center (bottom left), and the magnified surface morphology (right).
Figure 20:
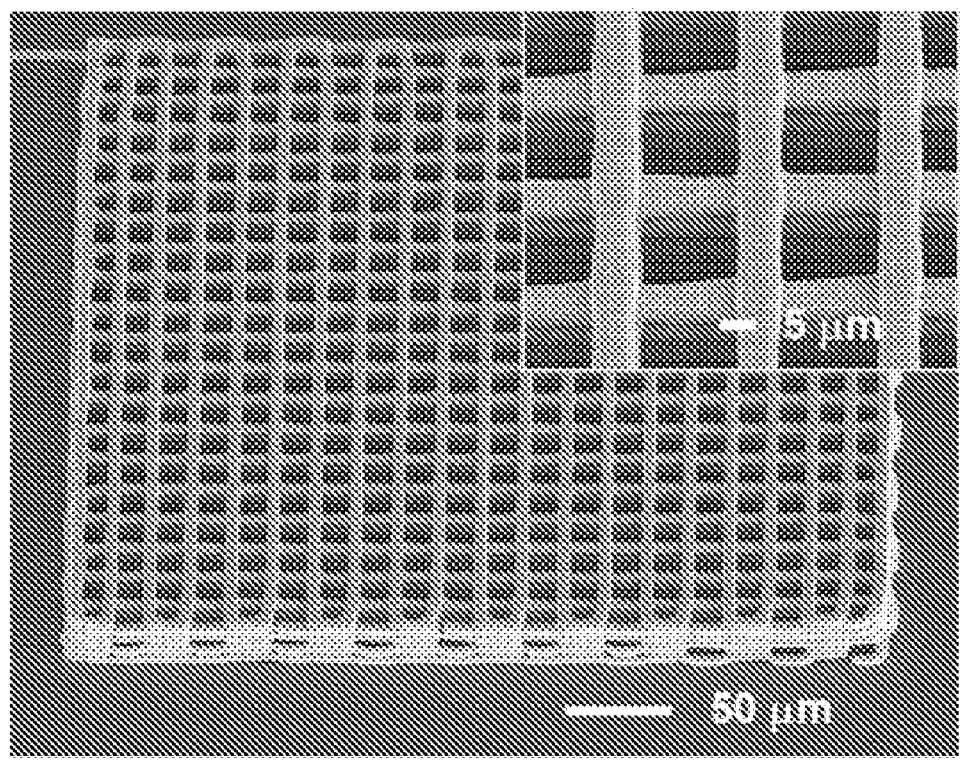
FIG. 20 is SEM micrographs of an 8 layer square lattice (400×400 µm, wire width 6 µm, center-to-center spacing 20 µm) printed by a 5 µm nozzle. Inset shows high magnification SEM image of the square lattice.

To demonstrate the self supporting capacity of silver particle inks as well as heterogeneous integration with other patterning approaches, interconnects (width 15 µm, height 13 µm) are printed onto silicon ribbons (width 45 µm, height 26 µm) separated by periodic gaps of 33 µm width (FIG. 14). The high magnification SEM micrograph (FIG. 14 inset) confirms the electrode spans the unsupported regions between ribbons without sagging. In addition, direct ink writing of silver particle ink exhibits the capacity to span extraordinarily long unsupported regions (>1.0 cm), as shown in FIG. 15. The electrical resistivity as a function of span length is shown in FIG. 16. Moreover, the incredibly stiff nature of the ink enables vertical printing between two substrates with different heights. For example, a set of electrodes are patterned onto two substrates with a 1 mm height difference at varying printing angles of 27°, 34°, and 45° (FIG. 17). In another case, vertically printed arched electrodes are used to connect a voltage source to a commercial GaN LED chip (1 mm×1 mm×200 μm) to illustrate the conductivity of these structures (FIG. 18). After heat treating at 200° C. for 3 h, the LED shows blue emission under an applied bias of 2 V (FIG. 18 inset). Furthermore, elaborate 3-D structures have been printed, such as hollow cylinders, cylindrical microcapacitors (FIG. 19), and microperiodic lattices using layer-by-layer assembly (FIG. 20).

Figure 21:
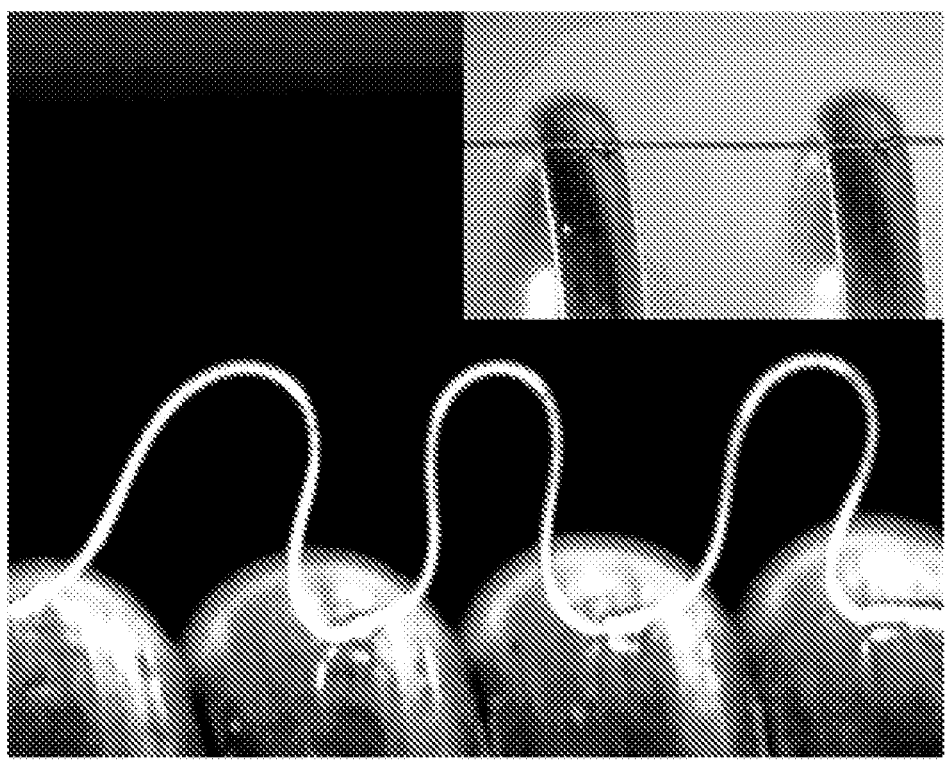
FIG. 21 is optical micrographs of stretchable silver arches printed on a spring. Stretchable arches form after printing a linear electrode on to a pre-strained spring (inset) and subsequently releasing the spring tension (main image).
Figure 22:
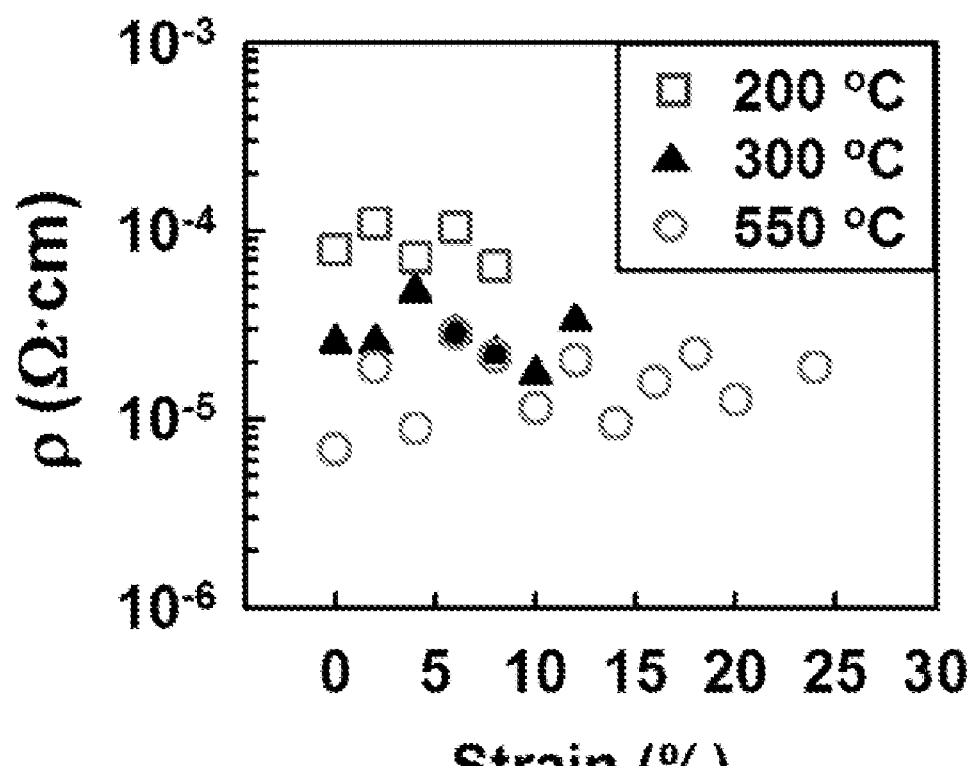
FIG. 22 is a graph of resistivity of the stretchable silver arches as a function of strain (%) and heat treatment temperature.
Figure 23:
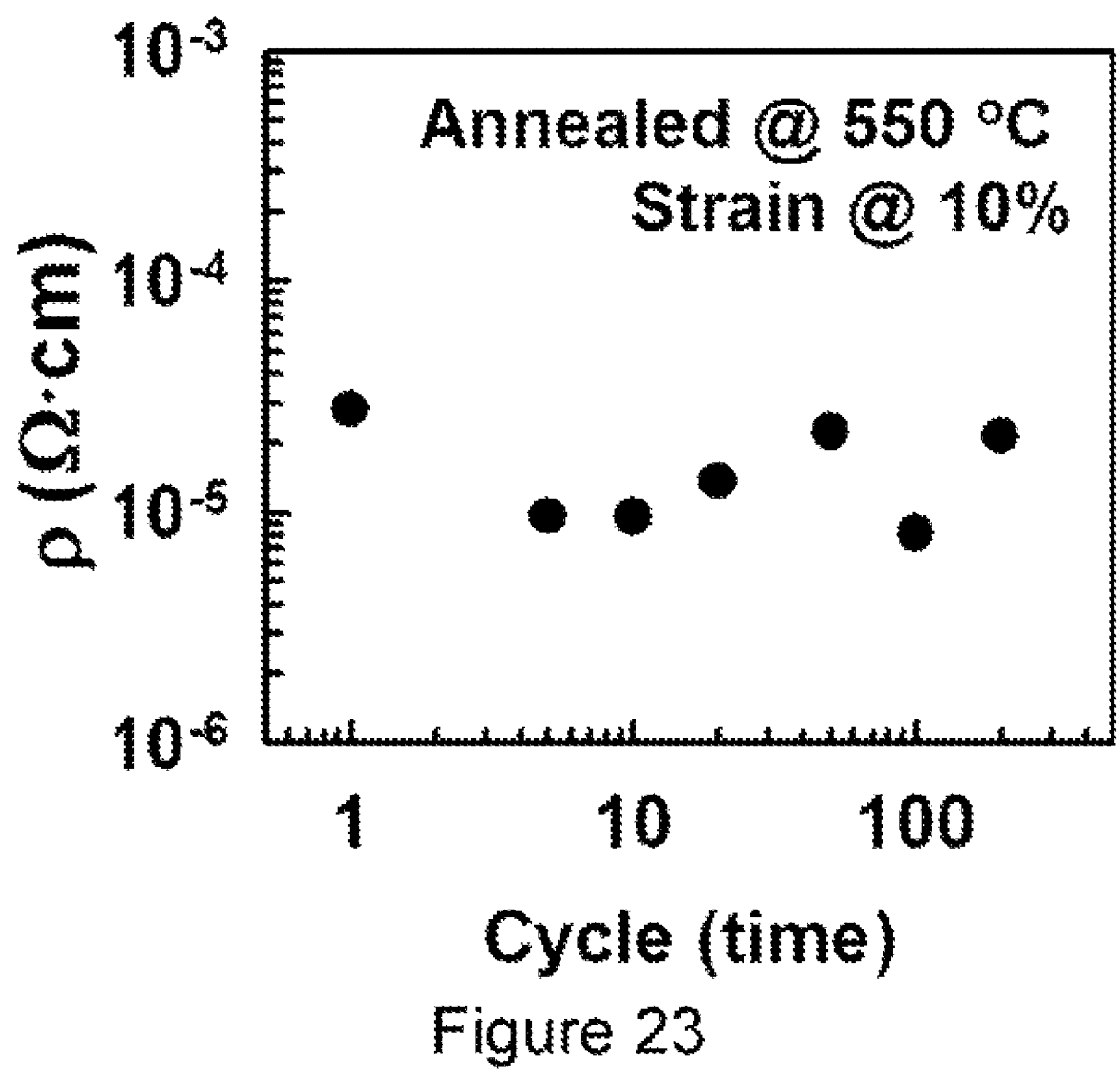
FIG. 23 is a graph of resistivity of stretchable silver arches as a function of strain cycle.

Ultrathin metal films and ribbons deposited onto pre-strained, stretchable substrates have been shown to form wavy buckles and arches upon release of the substrate from the stretched to the relaxed state.[22] These configurations even form in brittle materials such as silicon, due to the change in mechanical behavior of ultrathin materials compared to the bulk.[23] The built-in slack enables mechanical stretching while preserving the desired optoelectronic properties. Stretchable wavy and arched architectures can be created out of non-brittle materials that are not ultrathin, this is particularly true for ductile metals. For example, stretchable arches have been formed by printing a linear silver electrode onto a pre-strained spring (FIG. 21 inset), followed by strain release to form the arches (FIG. 21), and subsequent heat treatment. To ensure good adhesion and accurate resistivity measurements, a silicone adhesive is printed onto the spring at the silver contact positions as an insulation and adhesion layer both before and after printing of the silver ink. It is noteworthy that the arch amplitude increases with increasing magnitude of pre-strain ($\epsilon_{pre}$). The resistivity of the arches as function of strain (%) is shown in FIG. 22 at different heat treatment temperatures. The stretchability increases with increasing temperature from 8% at 200° C. and 12% at 300° C. to 25% at 550° C. This result is expected, since the grain size increases with temperature (FIG. 10), so the electrodes will more closely resemble the ductile, bulk material. Notably, straining the arched electrodes up to 200 cycles does not result in fatigue-induced failure of the connection, as exhibited by resistivity measurements acquired through the electrode (FIG. 23).

Characterization was carried out as follows. Silver electrode morphology is measured by a scanning electron microscope (JOEL 6060LV, JEOL Ltd.) after sputtering with Au/Pd for 30 s (Emitech K575 Sputter Coater). Ink particle size is obtained by transmission electron microscope (JOEL 2010Lab6 TEM, JEOL Ltd.). Viscosity and modulus of the inks are measured by a rheometer (C-VOR, Malvern Instruments, Melvern, UK) using a cone and plate geometry (CP 4/40, cone diameter 40 mm with a 4° angle and gap width of 0.15 mm) at 25° C. in the presence of water trap to prevent solvent evaporation during measurement. Ink solid content is determined by thermogravimetric analysis (Mettler Toledo TGA/SDTA851, Columbus, Ohio) with a heating rate of 10° C. min$^{-1}$ to 800° C. in air. Resistivity is measured using micropositioners (Signatone) with tungsten tips (SE-T, Signatone) attached to a source meter (Keithley 2400).

Mean particle size of the stabilized silver particles by transmission electron microscope (TEM) is about 20±5 nm with a size distribution between 5~50 nm. With the thermogravimetric analysis (TGA), weight changes are 7.0 wt % (150° C.), 12 wt % (200° C.), 15 wt % (250° C.), and 23 wt % (700° C.), respectively. The ink has rheological properties of viscosity ($\eta$=900 Pa·s), elastic modulus (G'=2670 Pa), and viscous modulus (G''=1450 Pa). The resistivity obtained from I-V characteristics and geometries of the electrodes after curing for 3 h results in 1,100 Ω·cm (150° C.), 1.77×10$^{-3}$ Ω·cm (175° C.), 2.2×10$^{-4}$ Ω·cm (200° C.), and 2.1×10$^{-5}$ Ω·cm (250° C.).

The research outlined here demonstrates synthesis of a silver particle ink that possesses many new properties, heretofore unseen in other inks for printed electronics. In summary, DIW of silver particle ink has been used to create fine scale, self-supporting, and 3-D metallic structures of arbitrary complexity. Low temperature processing ensures compatibility with flexible and stretchable substrates, enabling the creation of printed silver microelectrodes that are both bendable and stretchable. DIW of silver particle inks is a simple and low cost approach for the production and heterogenous integration of devices for high performance applications, such as photovoltaics, LEDs, RFIDs, antennas, and metamaterials.

REFERENCES (1) J.-U. Park, et al., Nature Mater. 2007, 6, 782.
(2) G. M. Gratson, et al., Nature 2004, 428, 386.
(3) J. A. Lewis and G. M. Gratson, Mater. Today 2004, 7, 32.
(4) E. Duoss, et al., Adv. Mater. 2007, 19, 3485.
(5) B.-H. Ryu, et al., Colloids Surf. A 2005, 270, 345.
(6) X. Xu, et al., Mater. Lett. 1998, 37, 354.
(7) N. Toshima, et al., Colloids Surf. A 2001, 177, 139.
(8) S. Magdassi, et al., Chem. Mater. 2003, 15, 2208.
(9) U.S. Pat. No. 6,878,184.
(10) W. Wang, et al., J. Phys. Chem. B 1999, 103, 7238.
(11) N. R. Jana, et al., J. Am. Chem. Soc. 2003, 125, 14280.
(12) X. Z. Lin, et al., Langmuir 2003, 19, 10081.
(13) U.S. Pat. No. 6,929,675.
(14) U.S. Pat. No. 6,645,444.
(15) R. T. Wu, et al., Mater. Res. Bull. 2008, 43, 1276.
(16) M. Yamamoto, et al., Langmuir 2006, 22, 8581.
(17) S. B. Fuller, et al., J. Microelectromech. Syst. 2002, 11, 54.
(18) D. Kim, et al., J. Appl. Phys. Lett. 2006, 89, 264101.
(19) J. Perelaer, et al., Adv. Mater. 2006, 18, 2101.
(20) K.-S. Moon, et al., J. Electron. Mater. 2005, 34, 168.
(21) K.-S. Chou, et al., Nanotechnology 2005, 16, 779.
(22) J. Jones, et al., J. Vac. Sci. Technol. A 2004, 22, 1723.
(23) D.-Y. Khang, et al., Science 2006, 311, 208.
(24) U.S. Pat. No. 4,410,457
(25) U.S. Pat. No. 5,147,841
(26) U.S. Pat. No. 5,957,828
(27) U.S. Pat. No. 6,103,868
(28) U.S. Pat. No. 6,262,129
(29) U.S. Pat. No. 6,436,167
(30) U.S. Pat. No. 6,451,433
(31) U.S. Pat. No. 6,572,673
(32) U.S. Pat. No. 6,746,510
(33) U.S. Pat. No. 6,942,825
(34) U.S. Pat. No. 6,974,493
(35) U.S. Pat. No. 7,081,322
(36) U.S. Pat. No. 7,160,525
(37) U.S. Pat. No. 7,198,736
(38) Y. Shiraishi and N. Toshima, Colloids and Surf. A: Physicochem. Eng. Aspects 2000, 169, 59.
(39) R. Chapman and P. Mulvaney, Chem. Phys. Lett. 2001, 349, 358.
(40) I. Pastoniza-Santos, et al., Langmuir 1999, 15, 948.
(41) D. E. Cliffel, et al., Langmuir 2000, 16, 9699.
(42) P. L. Kuo, et al., J. Phys. Chem. B 2003, 107, 11267.
(43) T. Pal, et al., Langmuir 1997, 13, 1481.
(44) B. L. V. Prasad, et al., Langmuir 2005, 21, 822.
(45) J. S. Chang, et al., Ind. Eng. Chem. Res. 2007, 46, 5591.
(46) A. Pyatenko, et al., J. Phys. Chem, C 2007, 111, 7910.
(47) A. Sliatan-Grijalva, et al., Mat. Res. Bull. 2008, 43, 90.

The invention claimed is:

1. Stabilized silver particles, comprising:
   particles comprising silver,
   a short-chain capping agent adsorbed on the particles, and
   a long-chain capping agent adsorbed on the particles,
   wherein the short-chain capping agent is a first anionic polyelectrolyte having a molecular weight (Mw) of at most 10,000,
   the long-chain capping agent is a second anionic polyelectrolyte having a molecular weight (Mw) of at least 25,000, and
   the stabilized silver particles have a loading of metallic silver of at least 50 wt %.

2. The stabilized silver particles of claim 1, wherein the first and second anionic polyelectrolytes both have carboxylic acid and/or carboxylate moiety containing repeating units.

3. The stabilized silver particles of claim 2, wherein the first and second anionic polyelectrolytes are both selected from the group consisting of poly(acrylic acid), poly(methacrylic acid), copolymers thereof and salts thereof.

4. The stabilized silver particles of claim 3, wherein the particles have a mean particle size of 10-50 nm.

5. The stabilized silver particles of claim 3, wherein the first anionic polyelectrolyte has a molecular weight (Mw) of 1,000-10,000.

6. The stabilized silver particles of claim 3, wherein the first anionic polyelectrolyte has a molecular weight (Mw) of 4,000-6,000.

7. The stabilized silver particles of claim 3, wherein the second anionic polyelectrolyte has a molecular weight (Mw) of 25,000-100,000.

8. The stabilized silver particles of claim 3, wherein the second anionic polyelectrolyte has a molecular weight (Mw) of 40,000-60,000.

9. The stabilized silver particles of claim 6, wherein the second anionic polyelectrolyte has a molecular weight (Mw) of 40,000-60,000.

10. A silver particle ink, comprising:
    particles comprising silver,
    a short-chain capping agent adsorbed on the particles,
    a long-chain capping agent adsorbed on the particles, and
    water,
    wherein the short-chain capping agent is a first anionic polyelectrolyte having a molecular weight (Mw) of at most 10,000,
    the long-chain capping agent is a second anionic polyelectrolyte having a molecular weight (Mw) of at least 25,000, and
    the silver particle ink has a solid loading of metallic silver of at least 50 wt %.

11. The silver particle ink of claim 10, further comprising a solvent which is soluble in water and has a higher boiling point than water.

12. The silver particle ink of claim 11, wherein the first and second anionic polyelectrolytes both have carboxylic acid and/or carboxylate moiety containing repeating units.

13. The silver particle ink of claim 12, wherein the first and second anionic polyelectrolytes are both selected from the group consisting of poly(acrylic acid), poly(methacrylic acid), copolymers thereof and salts thereof.

14. The silver particle ink of claim 13, wherein the particles have a mean particle size of 10-50 nm.

15. The silver particle ink of claim 13, wherein the first anionic polyelectrolyte has a molecular weight (Mw) of 1,000-10,000.

16. The silver particle ink of claim 13, wherein the first anionic polyelectrolyte has a molecular weight (Mw) of 4,000-6,000.

17. The silver particle ink of claim 13, wherein the second anionic polyelectrolyte has a molecular weight (Mw) of 25,000-100,000.

18. The silver particle ink of claim 13, wherein the second anionic polyelectrolyte has a molecular weight (Mw) of 40,000-60,000.

19. A silver particle ink, comprising:
    particles comprising silver, and
    an ink solvent,
    wherein the silver particle ink has a solid loading of metallic silver of at least 60 wt % and an apparent viscosity of at least about 100 Pa·S at a shear rate of $10^{-2}$ 1/s,
    the silver particle ink is shear thinning, and
    the silver particle ink has an elastic modulus, G', and viscous modulus, G", such that G'>G".

20. A method of forming stabilized silver particles, comprising:
    forming a solution comprising a reducing agent, a short-chain capping agent, a long-chain capping agent, and $Ag^+$ ions, to form silver particles; and
    growing the silver particles to a mean particle size of 10-50 nm;
    wherein the short-chain capping agent is a first anionic polyelectrolyte having a molecular weight (Mw) of at most 10,000,
    the long-chain capping agent is a second anionic polyelectrolyte having a molecular weight (Mw) of at least 25,000, and
    the reducing agent comprises a hydroxyl group terminated amine containing 2-10 carbon atoms.

* * * * *